(12) United States Patent
Kataoka et al.

(10) Patent No.: US 8,450,282 B2
(45) Date of Patent: May 28, 2013

(54) ANIONIC POLYMER, POLYION COMPLEX AND TERNARY POLYMER COMPOSITE USING ANIONIC POLYMER, AND PHARMACEUTICAL COMPOSITION

(75) Inventors: Kazunori Kataoka, Tokyo (JP); Atsushi Ishii, Tokyo (JP); Hiroyasu Takemoto, Tokyo (JP); Masataka Nakanishi, Tokyo (JP); Nobuhiro Nishiyama, Tokyo (JP); Kanjiro Miyata, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 13/386,554

(22) PCT Filed: Jul. 23, 2010

(86) PCT No.: PCT/JP2010/062400
§ 371 (c)(1),
(2), (4) Date: Apr. 9, 2012

(87) PCT Pub. No.: WO2011/010714
PCT Pub. Date: Jan. 27, 2011

(65) Prior Publication Data
US 2012/0196810 A1    Aug. 2, 2012

Related U.S. Application Data

(60) Provisional application No. 61/227,924, filed on Jul. 23, 2009.

(51) Int. Cl.
*A61K 38/00* (2006.01)
*C07K 14/72* (2006.01)
*C07K 14/705* (2006.01)

(52) U.S. Cl.
USPC .................. 514/20.9; 514/44 A; 536/23.1

(58) Field of Classification Search
None
See application file for complete search history.

(56) References Cited

U.S. PATENT DOCUMENTS

| 8,153,110 | B2 | 4/2012 | Kataoka et al. | |
| 2010/0121043 | A1 | 5/2010 | Kataoka et al. | |
| 2011/0060123 | A1 * | 3/2011 | Kataoka et al. | 530/322 |

FOREIGN PATENT DOCUMENTS

| EP | 2284210 A1 * | 2/2011 |
| JP | 2006 56864 | 3/2006 |
| JP | 2006-56864 | 3/2006 |
| JP | 2008 193977 | 8/2008 |
| JP | 2008-193977 | 8/2008 |
| JP | 2008 208055 | 9/2008 |
| JP | 2008-208055 | 9/2008 |
| JP | 2010 59064 | 3/2010 |
| JP | 2010-59064 | 3/2010 |
| JP | 2010 116383 | 5/2010 |
| JP | 2010-116383 | 5/2010 |
| WO | 2005 078084 | 8/2005 |
| WO | 2006 123631 | 11/2006 |
| WO | WO 2008/062909 A1 | 5/2008 |
| WO | 2009 057812 | 5/2009 |
| WO | WO 2009133968 A1 * | 11/2009 |

OTHER PUBLICATIONS

York A et al. "Rational Design of Targeted Cancer Therapeutics through the Multi-Conjugation of Folate and Cleavable siRNA to RAFT-synthesized (HPMA-s-APMA) Copolymers" Biomacromolecules 11:505-514. Published Jan. 5, 2010.*
International Search Report Issued Oct. 26, 2010 in PCT/JP10/62400 Filed Jul. 23, 2010.
Andrew Fire, et al., "Potent and specific genetic interference by double-stranded RNA in *Caenorhabditis elegans*", Nature, vol. 391, Feb. 19, 1998, pp. 806-811.
Sayda M. Elbashir, et al., "Duplexes of 21-nucleotide RNAs mediate RNA interference in cultured mammalian cells", Nature, vol. 411, May 24, 2001, pp. 494-498.
Tracy S. Zimmermann, et al., "RNAi-mediated gene silencing in non-human primates", Nature, vol. 441, May 4, 2006, pp. 111-114.
Masahiro Yamauchi, et al., "Improved formulations of antisense oligodeoxynucleotides using wrapped liposomes", Journal of Controlled Release, vol. 114, 2006, pp. 268-275.
Kazunori Kataoka, et al., "Spontaneous Formation of Polyion Complex Micelles with Narrow Distribution from Antisense Oligonucleotide and Cationic Block Copolymer in Physiological Saline", Macromolecules, vol. 29, No. 26, 1996, pp. 8556-8557.
Margreet A. Wolfert, et al., "Characterization of Vectors for Gene Therapy Formed by Self-Assembly of DNA with Synthetic Block Co-Polymers", Human Gene Therapy, vol. 7, Nov. 10, 1996, pp. 2123-2133.

(Continued)

*Primary Examiner* — Cecilia J Tsang
*Assistant Examiner* — Zachary J Miknis
(74) *Attorney, Agent, or Firm* — Oblon, Spivak, McClelland, Maier & Neustadt, L.L.P.

(57) ABSTRACT

There are provided an anionic polymer, a polyion complex, and a ternary polymer composite, each of which is stable in a biological environment and is capable of realizing small RNA delivery without causing any undesired immune response. An anionic polymer according to an embodiment of the invention includes: a main chain which includes repeating units having carboxyl groups; and a side chain which is linked with part of the carboxyl groups in the main chain and is represented by the following formula:

-A-B—X where: A represents a residue having one or more aminoethyl bonds; B represents an in vivo cleavable bond; and X represents a small RNA. A polyion complex according to an embodiment of the invention includes the anionic polymer as described above and a cationic polymer. A ternary polymer composite according to an embodiment of the invention includes the polyion complex as described above and a charge conversional polymer.

20 Claims, 11 Drawing Sheets

OTHER PUBLICATIONS

Satoshi Katayose, et al., "Water-Soluble Polyion Complex Associates of DNA and Poly(ethylene glycol)-Poly($_L$-lysine) Block Copolymer", Bioconjugate Chem., vol. 8, No. 5, 1997, pp. 702-707.
Satoshi Katayose, et al., "Remarkable Increase in Nuclease Resistance of Plasmid DNA through Supramolecular Assembly with Poly(ethylene glycol)-Poly($_L$-lysine) Block Copolymer", Journal of Pharmaceutical Sciences, vol. 87, No. 2, Feb. 1998, pp. 160-163.
Mikiko C. Siomi, "Short interfering RNA-mediated gene silencing; towards successful application in human patients", Advanced Drug Delivery Reviews, vol. 61, 2009, pp. 668-671.
Keiji Itaka, et al., "Supramolecular Nanocarrier of siRNA from PEG-Based Block Catiomer Carrying Diamine Side Chain with Distinctive $pK_a$ Directed To Enhance Intracellular Gene Silencing", J. Am. Chem. Soc., vol. 126, No. 42, 2004, pp. 13612-13613.
Satoru Matsumoto, et al., "Environment-Responsive Block Copolymer Micelles with a Disulfide Cross-Linked Core for Enhanced siRNA Delivery", Biomacromolecules, vol. 10, No. 1, 2009, pp. 119-127.
Dana J. Gary, et al., "Polymer-based siRNA delivery: Perspectives on the fundamental and phenomenological distinctions from polymer-based DNA delivery", Journal of Controlled Release, vol. 121, 2007, pp. 64-73.
Adam Judge, et al., "Overcoming the Innate Immune Response to Small Interfering RNA", Human Gene Therapy, vol. 19, Feb. 2008, pp. 111-124.
Adam D. Judge, et al., "Sequence-dependent stimulation of the mammalian innate immune response by synthetic siRNA", Nature Biotechnology, vol. 23, No. 4, Apr. 2005, pp. 457-462.
Joao T. Marques, et al., "Activation of the mammalian immune system by siRNAs", Nature Biotechnology, vol. 23, No. 11, Nov. 2005, pp. 1399-1405.

\* cited by examiner

FIG.1
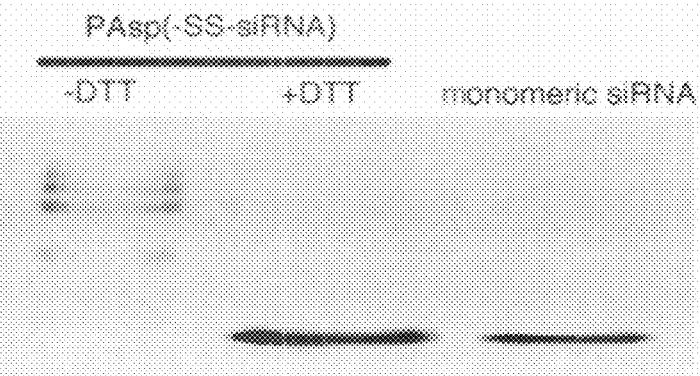
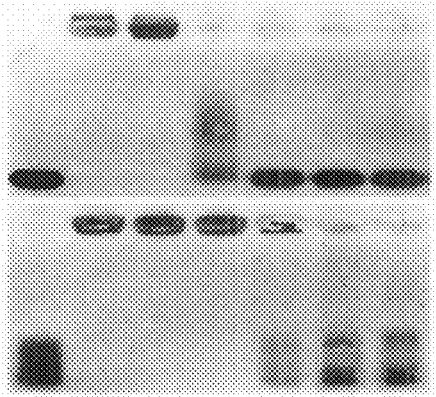
FIG.2A
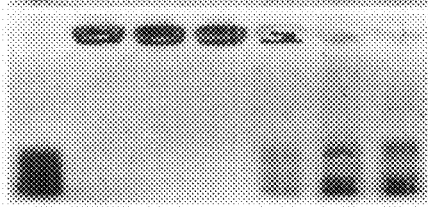
FIG.2B
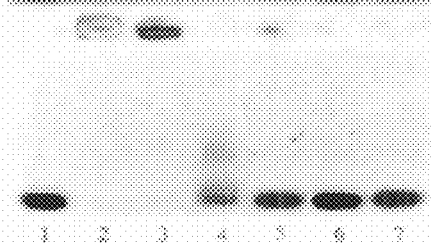
FIG.2C

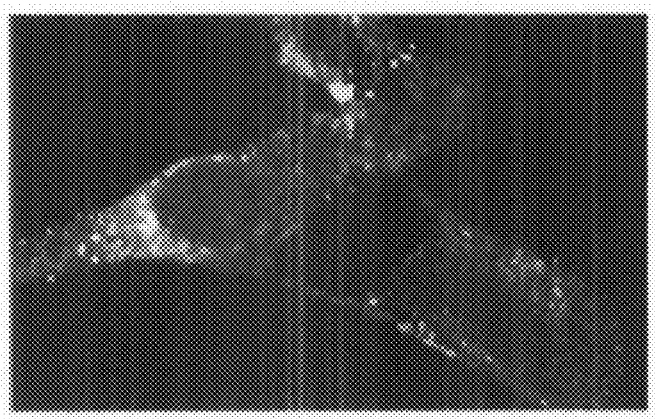
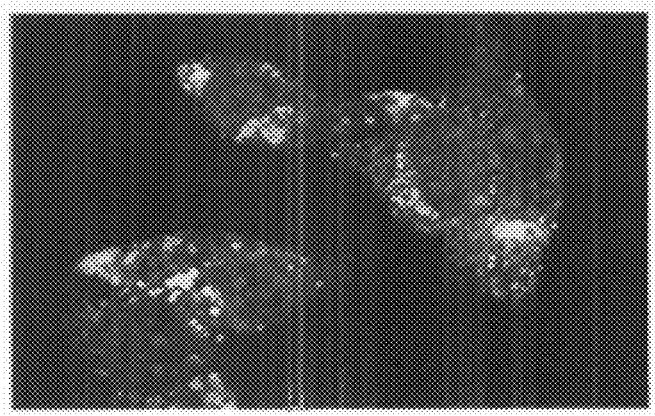
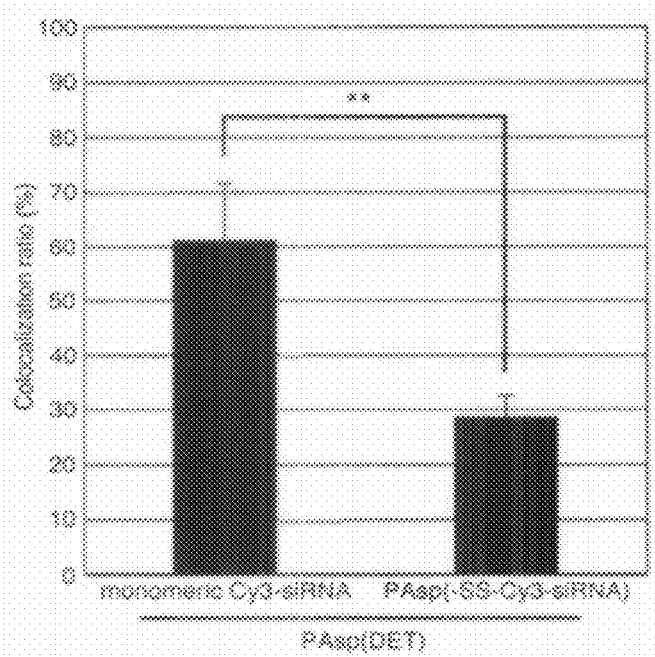

Knockdown assay of polyion complex prepared from PAsp(-SS-siRNA) and PAsp(DET) for Huh-7 cells.

Knockdown assay of polyion complex prepared from siRNA and PAsp(DET) for Huh-7 cells.

Knockdown assay of polyion complex prepared from PAsp(-SS-siRNA) and PAsp(DET) for B16F10-Luc cells.

Knockdown assay of polyion complex prepared from siRNA and PAsp(DET) for B16F10-Luc cells.

Knockdown assay of polyion complex prepared from PAsp(-SS-siRNA) and PEI for Huh-7 cells.

Knockdown assay of polyion complex prepared from siRNA and PEI for Huh-7 cells.

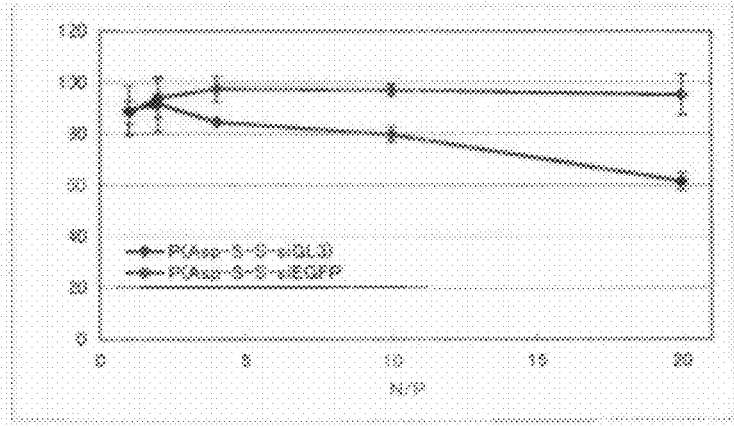

ANIONIC POLYMER, POLYION COMPLEX AND TERNARY POLYMER COMPOSITE USING ANIONIC POLYMER, AND PHARMACEUTICAL COMPOSITION

CROSS-REFERENCE TO RELATED APPLICATIONS

The present application is a 35 U.S.C. §371 National Stage patent application of International patent application PCT/JP2010/062400, filed on Jul. 23, 2010, which claims priority to U.S. patent application 61/227,924, filed on Jul. 23, 2009.

TECHNICAL FIELD

The present invention relates to an anionic polymer grafted with a side chain including a small RNA, a polyion complex and a ternary polymer composite which use the anionic polymer, and to a pharmaceutical composition.

BACKGROUND ART

Small interfering RNA (siRNA) is a double-stranded RNA of 19 to 21 base pairs and is a major molecule responsible for RNA interference (RNAi) known as a potent and specific gene expression silencing phenomenon (Non Patent Literature 1). In 2001, Tuschl et al. reported RNAi in mammalian cells (Non Patent Literature 2). Since then, research and development have been actively conducted towards applications of siRNA to treatments of any kinds of diseases. In this regard, however, the preceding development is directed to sites such as eyes and respiratory organs, in each of which siRNA easily reaches the affected part, resulting in a limited application range. In the first place, it is known that siRNA is an unstable chemical species easily degradable under a physiological environment, and undergoes rapid renal excretion when being intravenously administered alone to mice ($t_{1/2}$=several minutes). Thus, there is a strong demand for a drug delivery system (DDS) that improves the pharmacokinetics of siRNA, which is regarded as crucial for the practical use of siRNA.

However, a systemic DDS still remains at a laboratory level and is far from practical use. Even a system of stable nucleic acid lipid particles (SNALP) collaboratively developed by Alnylam and Protiva Biotherapeutics, both of which have published most pioneering accomplishments, is hardly applied to tissues other than the liver because of its passive uptake into the liver (Non Patent Literature 3). On the other hand, for only a problem of long-term retention in the bloodstream, a system of wrapped liposomes developed by Kyowa Hakko Kogyo Co., Ltd., though directed to a single-stranded DNA, succeeded in markedly improving retention (Non Patent Literature 4). Hence, the system is greatly expected to be applicable to siRNA as well in the future. However, a system using liposomes, which is too stable, often makes it difficult to release a drug in the system.

As described above, a technology that improves the pharmacokinetics of siRNA and allows the administration of siRNA in the bloodstream is extremely important in expanding applications of siRNA. It has hitherto been reported that, regarding plasmid DNA or antisense DNA, a nanometer-scale structure (i.e., polymer micelle) encapsulating the DNA, which is formed using a polyethylene glycol-polylysine block co-polymer (PEG-PLys), is useful (NonPatent Literatures 5 to 8). Such polymer micelle is formed by self-assembly through an electrostatic interaction between a polycation moiety (polylysine moiety in PEG-PLys) in the block co-polymer and a nucleic acid molecule (e.g., DNA) as a polyanion. The formed polymer micelle has a core-shell type structure in which a polyion complex moiety including the polycation and the polyanion serves as an inner core-like moiety and its surface layer is covered with polyethylene glycol (PEG). Therefore, the polymer micelle is expected to potentially avoid the mechanism of xenobiotic recognition and renal excretion.

The inventors of the present invention have made an attempt at forming a polymer micelle encapsulating siRNA using PEG-PLys as a measure for improving the pharmacokinetics of siRNA in view of the fact that the plasmid DNA or antisense DNA is an siRNA analogue. However, the polymer micelle actually obtained was low in structural stability, did not sufficiently have a desired core-shell type micelle structure, and was extremely poor in siRNA delivery capacity to cultured cancer cells. Therefore, it was extremely difficult to utilize PEG-PLys as a carrier for siRNA.

Further, a polyion complex (PIC) formed through an electrostatic interaction between anionic siRNA and a polycation is utilized in a DDS (Patent Literature 1 and Non Patent Literatures 9 to 11). However, siRNA hardly forms a stable micelle under a physiological condition mainly because of its small size (21 base pairs). Hence, the stabilization of a PIC in a biological environment is a current problem (Non Patent Literature 12). In order to form a stable PIC, preferred is a long double-stranded RNA (dsRNA) having a large number and high density of anionic charges. This is because there occurs a cumulative interaction with a polycation. However, a long dsRNA structure involves a problem in that it causes IFN-α responses via a plurality of passways including recognition by Toll-like receptor-3 (TLR3) and activation of protein kinase R (PKR) (Non Patent Literatures 13 to 15).

In addition, microRNA (miRNA) is also a small RNA like siRNA, is capable of silencing gene expression through the same mechanism as siRNA, and hence is expected to be utilized in a DDS like siRNA. However, a DDS using miRNA also involves the same problem as in the case of siRNA.

As described above, there is a strong demand for such means for delivering small RNAs (for example, siRNA and miRNA) as to be stable in a biological environment without causing any undesired immune response.

CITATION LIST

Patent Literature

[PTL 1] WO 2008/062909 A1

Non Patent Literature

[NPL 1] Fire A et al., Potent and specific genetic interference by double-stranded RNA in *Caenorhabditis elegans.*, Nature, vol. 391, p. 806-811, 1998

[NPL 2] Sayda M et al., Duplexes of 21-nucleotide RNAs mediate RNA interference in cultured mammalian cells, Nature, vol. 411, p. 494-498, 2001

[NPL 3] Tracy S et al., RNAi-mediated gene silencing in non-human primates, Nature, vol. 441, p. 111-114, 2006

[NPL 4] Masahiro Yamauchi et al., Improved formulations of Antisense oligonucleotides using wrapped liposomes, J. Control Release, vol. 114, p. 268-275, 2006

[NPL 5] K. Kataoka et al., Spontaneous formation of polyion complex micelles with narrow distribution form antisense oligonucleotide and cationic block copolymer in physiological saline, Macromolecules, vol. 29, p. 8556-8557, 1996

[NPL 6] M. A. Woflert et al., Characterization of vector for gene therapy formed by self-assembly of DNA with synthetic block co-polymers. Hum., Gene Ther., vol. 7, p. 2123-2133, 1996

[NPL 7] S. Katayose et al., Water-soluble polyion complex associates of DNA and poly(ethylene glycol)-poly(L-lysine) block copolymer. Bioconjug., Chem., vol. 8, p. 702-707, 1997

[NPL 8] S. Katayose et al., Remarkable increase in nuclease resistance of plasmid DNA through supramolecular assembly with poly(ethylene glycol)-poly(L-lysine) block copolymer, J. Pharm. Sci., vol. 87, p. 160-163, 1998

[NPL 9] Siomi M C. Short interfering RNA-mediated gene silencing; towards successful application in human patients. Adv Drug Deliv Rev 2009; 61: 668-671

[NPL 10] Itaka K et al., Supramolecular nanocarrier of siRNA from PEG-based block catiomer carrying diamine side chain with distinctive pK (a) directed to enhance intracellular gene silencing. J Am Chem Soc 2004; 126: 13612-13613

[NPL 11] Matsumoto S et al., Environment-responsive block copolymer micelles with a disulfide cross-linked core for enhanced siRNA delivery. Biomacromolecules 2009; 10: 119-127

[NPL 12] Gary D J, Puri N, Won Y Y. Polymer-based siRNA delivery: Perspectives on the fundamental and phenomenological distinctions from polymer-based DNA delivery. J Control Release 2007; 121: 64-73

[NPL 13] Judge A, MacLachlan I. Overcoming the innate immune response to small interfering RNA. Hum Gene Ther 2008; 19: 111-124

[NPL 14] Judge A D, Sood V, Shaw J R, Fang D, McClintok K, MacLachlan I. Sequence-dependent stimulation of the mammalian innate immune response by synthetic siRNA. Nat Biotech 2005; 23: 457-462

[NPL 15] Marques J T, Williams B R G. Activation of the mammalian immune system by siRNAs. Nat Rev Biotech 2005; 23: 1399-1405

SUMMARY OF INVENTION

Technical Problem

The present invention has been made in order to solve the problems. An object of the present invention is to provide an anionic polymer, a polyion complex, and a ternary polymer composite, each of which is stable in a biological environment and is capable of realizing small RNA delivery without causing any undesired immune response.

Solution to Problem

An anionic polymer according to an embodiment of the present invention includes: a main chain which includes repeating units having carboxyl groups; and a side chain which is linked with part of the carboxyl groups in the main chain and is represented by the following formula:

-A-B—X where: A represents a residue having one or more aminoethyl bonds; B represents an in vivo cleavable bond; and X represents a small RNA.

In one embodiment of the invention, the main chain includes polyamino acid having carboxyl groups, polyvinyl having carboxyl groups, polyester having carboxyl groups, polysaccharide having carboxyl groups, dendrimer (cascade polymer) having carboxyl groups, or a combination thereof.

In one embodiment of the invention, the in vivo cleavable bond includes a bond selected from a disulfide bond, an acetal bond, and a hydrazone bond.

In one embodiment of the invention, the anionic polymer is represented by the following general formula (I):

[Chem. 1]

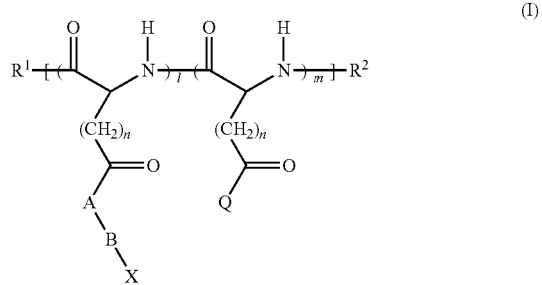

where: $R^1$ and $R^2$ each independently represent a hydrogen atom, an unsubstituted or substituted linear or branched $C_1$-$C_{12}$ alkyl group, or a polyethylene glycol chain; A represents a residue having one or more aminoethyl bonds; B represents an in vivo cleavable bond; Q represents a hydroxyl group or a group derived from A in which an aminoethyl bond is substituted by a hydroxyl group; X represents a small RNA; l represents an integer of 1 to 500; m represents an integer of 1 to 499; and n represents an integer of 1 to 5, with the proviso that a sum of l and m is 10 to 500, and repeating units represented by l and m are arranged at random.

In one embodiment of the invention, A represents —NH—$(CH_2)_2$— and Q represents —OH in the general formula (I).

In one embodiment of the invention, l represents an integer of 2 or more in the general formula (I).

According to another aspect of the invention, a polyion complex is provided. The polyion complex includes: the anionic polymer as described above; and a cationic polymer selected from the group consisting of polyethylene imine, polyarginine, polylysine, poly-[2-{(2-aminoethyl)amino}-ethyl-aspartamide] (pAsp(DET)), a block co-polymer of polyethylene glycol and polyarginine, a block co-polymer of polyethylene glycol and polylysine, and a block co-polymer of polyethylene glycol and poly-[2-{(2-aminoethyl)amino}-ethyl-aspartamide] (PEG-pAsp(DET)).

According to still another aspect of the invention, a ternary polymer composite is provided. The ternary polymer composite includes: the polyion complex as described above; and a charge conversional polymer represented by the following general formula (II):

[Chem. 2]

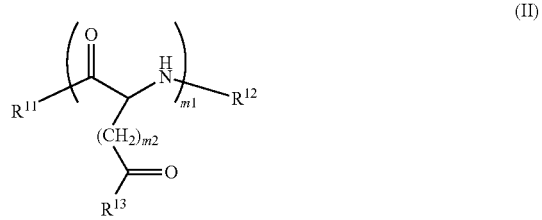

where: $R^{11}$ and $R^{12}$ each independently represent a hydrogen atom, an unsubstituted or substituted linear or branched $C_1$-$C_{12}$ alkyl group, or a polyethylene glycol chain; $R^{13}$ represents a conjugate of a residue derived from an amine compound having a primary amine, with a compound represented by the following formula (10) or a derivative thereof:

[Chem. 3]

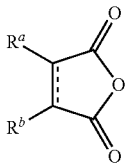
(10)

where: $R^a$ and $R^b$ each independently represent a hydrogen atom or an unsubstituted or substituted alkyl, alkenyl, cycloalkyl, aryl, aralkyl, acyl, heterocyclic ring, heterocyclic-alkyl, hydroxyl, alkoxyl, or aryloxy group, with the proviso that $R^a$ and $R^b$ may be bonded together to form an aromatic or cycloalkyl ring with carbon atoms to which $R^a$ and $R^b$ are bonded, respectively, and a bond between the carbon atoms to which $R^a$ and $R^b$ are bonded is single or double; m1 represents an integer of 10 to 500; and m2 represents an integer of 1 to 5.

In one embodiment of the invention, the residue derived from an amine compound having a primary amine is represented by the following formula (11) or (12):

$$—NH—(CH_2)_r—NH_2 \quad (11)$$

in the formula (11), r represents an integer of 0 to 5; or $$—[NH—(CH_2)_{s1}]_{t1}—NH_2 \quad (12)$$

in the formula (12): in [NH—(CH$_2$)$_{s1}$] units, s1's each independently represent an integer of 1 to 5; and t1 represents an integer of 2 to 5.

In one embodiment of the invention, the residue derived from an amine compound having a primary amine is —NH—(CH$_2$)$_2$—NH$_2$ or —NH—(CH$_2$)$_2$—NH—(CH$_2$)$_2$—NH$_2$.

In one embodiment of the invention, the compound represented by the formula (10) includes at least one compound selected from compounds represented by the following formulae (Ia) to (Ig):

[Chem. 4]

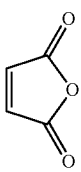
(Ia)

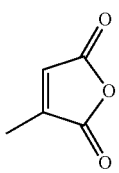
(Ib)

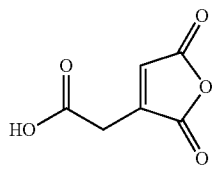
(Ic)

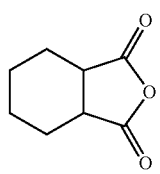
(Id)

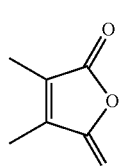
(Ie)

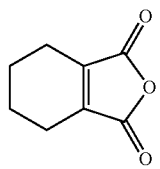
(If)

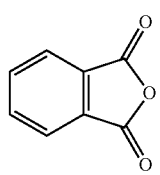
(Ig)

According to still another aspect of the invention, a pharmaceutical composition is provided. In one embodiment, the pharmaceutical composition includes: the polyion complex as described above; and a pharmaceutically acceptable carrier. In another embodiment, the pharmaceutical composition includes: the ternary polymer composite as described above; and a pharmaceutically acceptable carrier.

Advantageous Effects of Invention

According to the present invention, the anionic polymer, which is stable in a biological environment and is capable of realizing small RNA delivery means without causing any undesired immune response, can be provided by introducing a small RNA into a polymer side chain through grafting. In addition, the polyion complex formed of the anionic polymer of the present invention has a large introduction amount of small RNA into the anionic polymer and a very large association number, and hence has a very high small RNA delivery capacity.

BRIEF DESCRIPTION OF DRAWINGS

FIG. 1 is an image showing the results of observation by polyacrylamide gel electrophoresis for an anionic polymer obtained in Example 1.

FIGS. 2A to 2C are images showing the results of analysis by agarose gel electrophoresis for the stability of polyion complexes (PICs) of Example 2 and Comparative Example 1.

FIGS. 4A and 4B are images showing the results of observation with a confocal laser scanning microscope (CLSM) for the distribution of siRNA in the B16F10-Luc cells of the PIC of Example 2 or the PIC of Comparative Example 1, and FIG. 4C is a graph showing the endosomal escaping efficacy of siRNA of the PIC of Example 2 or the PIC of Comparative Example 1.

FIG. 8 discloses "pAsp$_{100}$" and "pAsp$_{200}$" as SEQ ID NOS: 5 and 6, respectively.

FIG. 12 is a graph showing the results of knockdown assay for a PIC of Example 5.

DESCRIPTION OF EMBODIMENTS

Figure 3A:
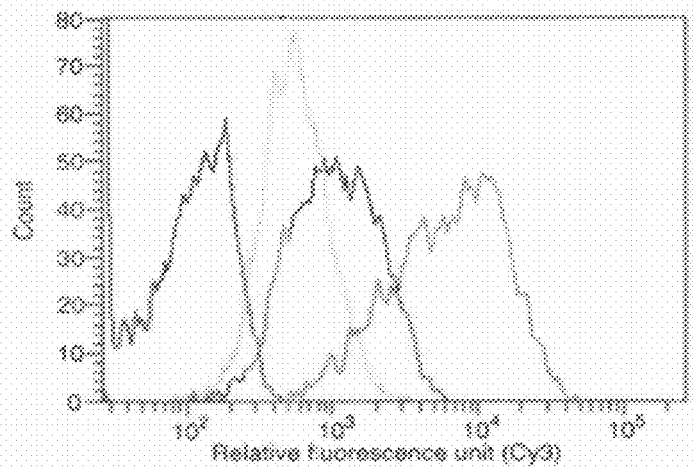
FIGS. 3A and 3B are graphs showing the results of examination by flow cytometry for the uptake of the PIC of Example 2 or the PIC of Comparative Example 1 by murine melanoma B16F10 cells.

Hereinafter, embodiments of the present invention are specifically described. However, the present invention is not limited to these embodiments. Further, this description encompasses the contents described in the specification of U.S. Provisional Application No. 61/126,077, from which the present application claims priority. In addition, all references and publications disclosed in this description are incorporated herein by reference in their entireties.

A. Anionic Polymer

An anionic polymer according to an embodiment of the present invention includes: a main chain which includes repeating units having carboxyl groups; and a side chain which is linked with part of the carboxyl groups in the main chain and is represented by the following formula:

-A-B—X where: A represents a residue having one or more aminoethyl bonds; B represents an in vivo cleavable bond; and X represents a small RNA.

As used herein, the "small RNA" refers to an RNA having a chain length (in the case of a double strand, a length of a part constructing the double strand) of 50 bases or less. Representative examples of the small RNA include siRNA and miRNA. As the siRNA and miRNA, for example, all of those designed for a gene or a polynucleotide of interest by a known method may be used. The siRNA and miRNA may each have a chain length (in the case of double-stranded siRNA, a length of apart constructing the double strand) of preferably 15 to 50 bases, more preferably 18 to 30 bases, and compounds known in the art and all nucleotides having the same actions or functions as those compounds are encompassed. Specific examples of the siRNA and miRNA may be designed with reference to a gene which may serve as a target of a gene therapy, but are not limited thereto. Examples of such gene include, but not limited to, genes of PKCα associated with non-small cell lung carcinoma and the like, BCL-2 associated with malignant melanoma and the like, ICAM-1 associated with Crohn's disease, HCV associated with hepatitis C, TNFα associated with rheumatoid arthritis or psoriasis, an adenosine AI receptor associated with asthma, c-raf kinase associated with ovary cancer and the like, H-ras associated with pancreas cancer and the like, c-myc associated with coronary artery diseases, PKA Ria associated with large bowel cancer, HIV associated with AIDS, DNA methyl transferase associated with solid cancers, a VEGF receptor associated with cancers, ribonucleotide reductase associated with kidney cancer, CMV IE2 associated with CMV retinitis, MMP-9 associated with prostate cancer, TGFβ2 associated with malignant glioma, CD49d associated with multiple sclerosis, PTP-1B associated with diabetes, c-myb associated with cancers, EGFR associated with breast cancer and the like, and mdrl, autotaxin, and GLUT-1 associated with cancers. Also for an antisense nucleic acid, those known in the art or all having the same functions or actions as those can be encompassed. It should be noted that, for the sake of simplicity, in the following part of this description, a description is made of a case where siRNA is used as a representative example of the small RNA, but as a matter of course, the description is also applicable to miRNA and any other small RNA.

Any appropriate construction may be adopted as the main chain as long as the construction includes repeating units having carboxyl groups and the side chain may be appropriately introduced therein. Preferred specific examples of a carboxyl group-containing monomer constructing the repeating units are an amino acid, a vinyl monomer, a dicarboxylic acid and a diol, and a monosaccharide. As long as an effect of the present invention is exerted, such monomer may be polymerized alone, or a plurality of such monomers may be co-polymerized. Thus, specific examples of the main chain include polyamino acid having carboxyl groups, polyvinyl having carboxyl groups, polyester having carboxyl groups, polysaccharide having carboxyl groups, dendrimer (cascade polymer) having carboxyl groups, and a combination thereof.

Any appropriate chemical bond applicable to a DDS may be adopted as the in vivo cleavable bond. Representative examples of such bond include disulfide, acetal, ketal, hydrazone, enol ether, enol ester, amide, imine, iminium, enamine, silyl ether, silazane, silyl enol ether, diol, diazo, ester, sulfone, and silicon-carbon bonds. Of those, disulfide, acetal, and hydrazone bonds are preferred. For example, the disulfide bond (—S—S—) is easily cleaved in a reductive environment. By use of such characteristic, a high siRNA delivery capacity to cells can be achieved. Specifically, in vivo, an extracellular environment is non-reductive (about 10 μM) and an intracellular environment is reductive (about 10 mM) owing to a difference in concentration of glutathione. Thus, a polyion complex and a ternary polymer composite which use the anionic polymer of the present invention (both of which are described later) can maintain their siRNA-encapsulated forms in a stable manner until reaching target cells, and after being taken up into the target cells, can smoothly and efficiently release siRNA into the target cells through the cleaveage of a bond between sulfur atoms in a disulfide bond. As a result, RNAi-induced gene expression silencing efficiency (knockdown efficiency) and the like can be markedly improved. Further, for example, the acetal and hydrazone bonds are easily cleaved owing to a difference in pH between inside and outside cells. Specifically, in vivo, an extracellular pH is about 7, whereas a pH in intracellular late endosomes is 4 to 5. The acetal and hydrazone bonds maintain the bonds extracellularly and are easily cleaved in intracellular late endosomes. As a result, in the same manner as in the case of the disulfide bond, the polyion complex and ternary polymer composite which use the anionic polymer of the present invention can maintain their siRNA-encapsulated forms in a stable manner until reaching target cells, and after being taken up into the target cells, can smoothly and efficiently release siRNA into the target cells. As described above, the anionic polymer of the present invention immobilizes siRNA through a specific covalent bond as described above. Hence, the use of the anionic polymer for the polyion complex and ternary polymer composite as siRNA delivery means allows siRNA, which is an unstable chemical species easily degradable in a physiological environment, to be kept in an extremely stable state until being introduced into target cells, and allows siRNA to be efficiently released (introduced into cells) in response to an environmental change from extracellular to intracellular environments. In particular, by virtue of the immobilization of a plurality of siRNAs on one polymer via a covalent bond, a markedly stable polyion complex can be formed as compared to a case where single siRNA is encapsulated through an electrostatic interaction. In addition, the introduction of siRNA as a side chain including siRNA into repeating units having polycarboxylic acid can form a polyion complex having a markedly large introduction amount (content) of siRNA. The above-mentioned effects are synergistically exhibited, and hence the polyion complex and ternary polymer composite which use the anionic polymer of the present invention have extremely high usefulness as intelligent vectors for siRNA.

The anionic polymer is preferably represented by the following general formula (I):

[Chem. 5]

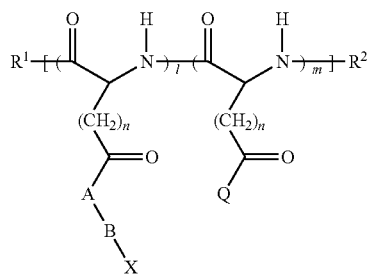

(I)

where: $R^1$ and $R^2$ each independently represent a hydrogen atom, an unsubstituted or substituted linear or branched $C_1$-$C_{12}$ alkyl group, or a polyethylene glycol chain; A represents a residue having one or more aminoethyl bonds; B represents an in vivo cleavable bond; Q represents a hydroxyl group or a group derived from A in which an aminoethyl bond is substituted by a hydroxyl group; X represents an siRNA; l represents an integer of 1 to 500; m represents an integer of 1 to 499; and n represents an integer of 1 to 5, with the proviso that the sum of l and m is 10 to 500, and repeating units represented by l and m are arranged at random.

Representative examples of the unsubstituted or substituted linear or branched $C_1$-$C_{12}$ alkyl group represented by $R^1$ and $R^2$ above include methyl, ethyl, n-propyl, iso-propyl, n-butyl, sec-butyl, tert-butyl, n-pentyl, n-hexyl, decyl, and undecyl groups. A substituent in the substituted alkyl group is exemplified by acetalized formyl, cyano, formyl, carboxyl, amino, $C_1$-$C_6$ alkoxycarbonyl, $C_2$-$C_7$ acylamide, identical or different tri($C_1$-$C_6$ alkyl)siloxy, siloxy, and silylamino groups. Examples of the polyethylene glycol chain include a structure having a molecular weight of 2,000 to 20,000.

As used herein, the "residue having one or more aminoethyl bonds" represented by A above refers to a residue including an $-NH-(CH_2)_2-$ moiety. Specific examples of such residue include:

$-NH-(CH_2)_2-[NH-(CH_2)_{p1}-]_{q1}-$;

$-NH-(CH_2)_2-N\{[-(CH_2)_{p2}-NH_2][-(CH_2)_{p3}-NH-]_{q2}\}$;

$-NH-(CH_2)_2-N\{[-(CH_2)_{p4}-NH-][[-(CH_2)_{p5}-NH-]_{q3}H]\}$; and $-NH-(CH_2)_2-[NR^cH-(CH_2)_{p6}-]-C\{[-(CH_2)_{p7}-NH_2][-NH-]\}$, where: p1 to p7 and q2 and q3 each independently represent an integer of 1 to 5; q1 represents an integer of 0 to 5; and $R^c$ represents a hydrogen atom or a cis-aconityl or cis-citraconyl group.

In one embodiment, the A represents $-NH-(CH_2)_2-$ and the Q represents $-OH$.

The sum of l and m is preferably 50 to 500, more preferably 80 to 220. l represents an integer of preferably 2 or more, more preferably an integer of 2 to 18. The introduction ratio (corresponding to a ratio of l with respect to the sum of l and m) of siRNA is preferably 3% to 30%, more preferably 3% to 6%. For example, when the anionic polymer has a polymerization degree of 100, the number of siRNA molecules introduced per polymer chain may be 3 to 30. Thus, according to the present invention, a plurality of siRNAs can be introduced into a polymer chain. Hence, when a polyion complex (PIC) is formed using the polymer of the present invention, the content of siRNA becomes markedly large as compared to a PIC in which siRNA is encapsulated through an electrostatic interaction. As a result, siRNA can be delivered in a large amount to target cells.

As an example, a description is made of a manufacturing method for the anionic polymer of the present invention in the case of using polyaspartic acid as the main chain and using poly-[2-{(2-aminoethyl)amino}-ethyl-aspartamide] (pAsp (DET)) as the cationic polymer. For the sake of convenience, a synthetic method for pAsp(DET) is first described. Poly(β-benzyl L-aspartate) (PBLA) is synthesized by subjecting β-benzyl L-aspartate N-carboxy anhydride (BLA-NCA), which has been synthesized by a known method, to ring-opening polymerization using n-butylamine. The PBLA may be typically protected by the acetylation of the N-terminus using acetic anhydride (PBLA protected with an acetyl group is also referred to as PBLA-Ac). Next, an N—{N-(2-aminoethyl)-2-aminoethyl} moiety is introduced into the side chain of PBLA-Ac by the aminolysis of a benzyl group in PBLA-Ac using diethylenetriamine (DET), followed by dialysis against a hydrochloric acid solution, to obtain poly[N—{N-(2-aminoethyl)-2-aminoethyl}aspartamide]hydrochloride salt (pAsp(DET)). The reaction scheme is as described below.

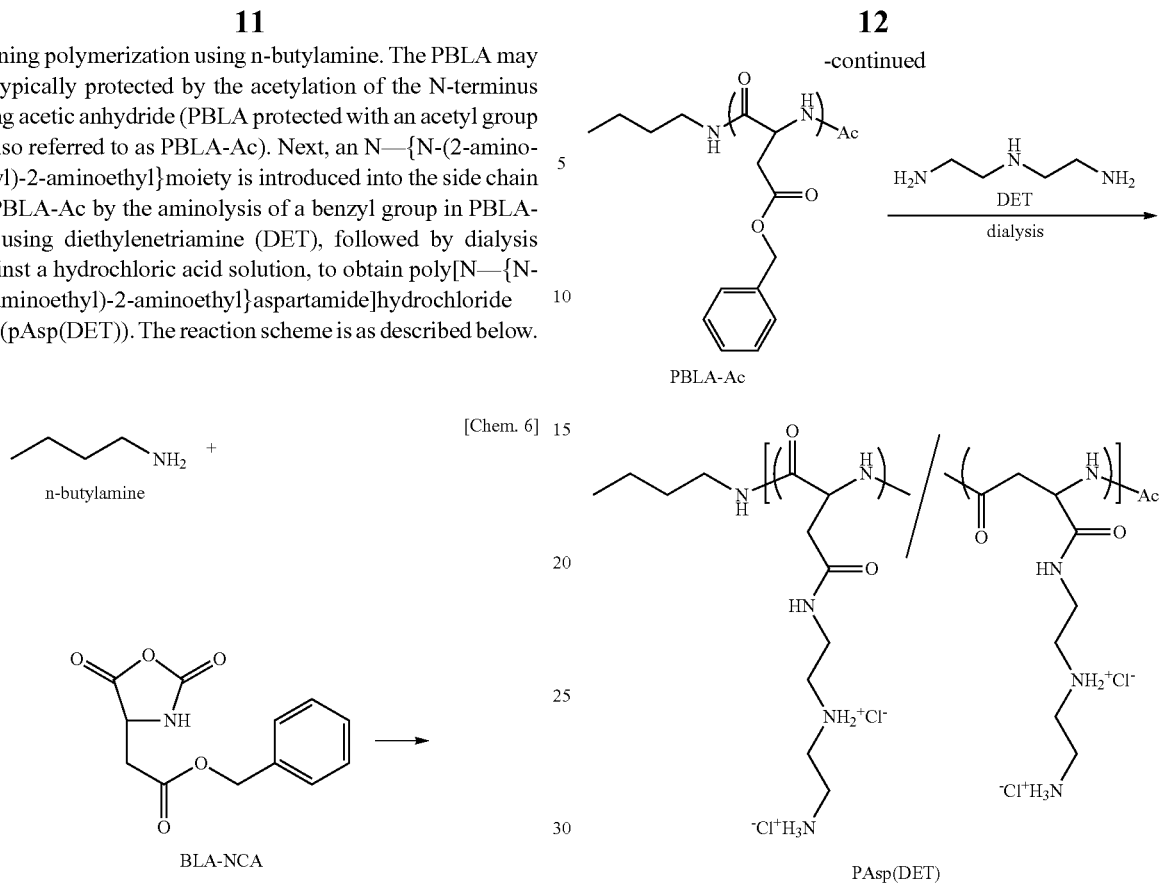

Next, the benzyl group of PBLA obtained in the same manner as described above is deprotected to obtain poly (aspartic acid) sodium salt (pAsp). Meanwhile, a reaction between 2,2'-dithiodipyridine and 2-aminoethanethiol hydrochloride yields 2-(2-pyridyldithio)ethylamine hydrochloride (PDTA). Poly(aspartic acid) modified with 2-(2-pyridyldithio)ethylamine (pAsp(-SS-Py)) is synthesized by a condensation reaction between a carboxyl group in pAsp and a primary amino group in PDTA using a triazine-based condensation agent DMT-MM. Next, sense strand RNA (ssRNA) is introduced into pAsp(-SS-Py) by a substitution reaction with a thiol group at the 5'-chain end of ssRNA-SH, followed by size exclusion chromatographic purification to obtain pAsp[pAsp(-SS-ssRNA)] grafted with sense strand RNA. The pAsp(-SS-ssRNA) is annealed with antisense strand RNA (asRNA) to obtain poly(aspartic acid) grafted with siRNA through a disulfide bond [pAsp(-SS-siRNA)], which is the anionic polymer of the present invention. The reaction scheme is as described below.

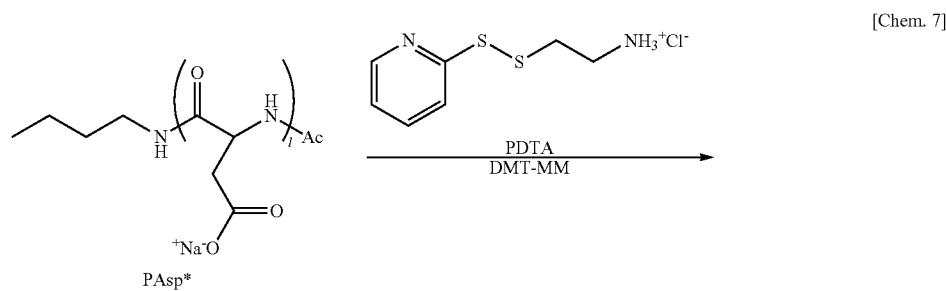

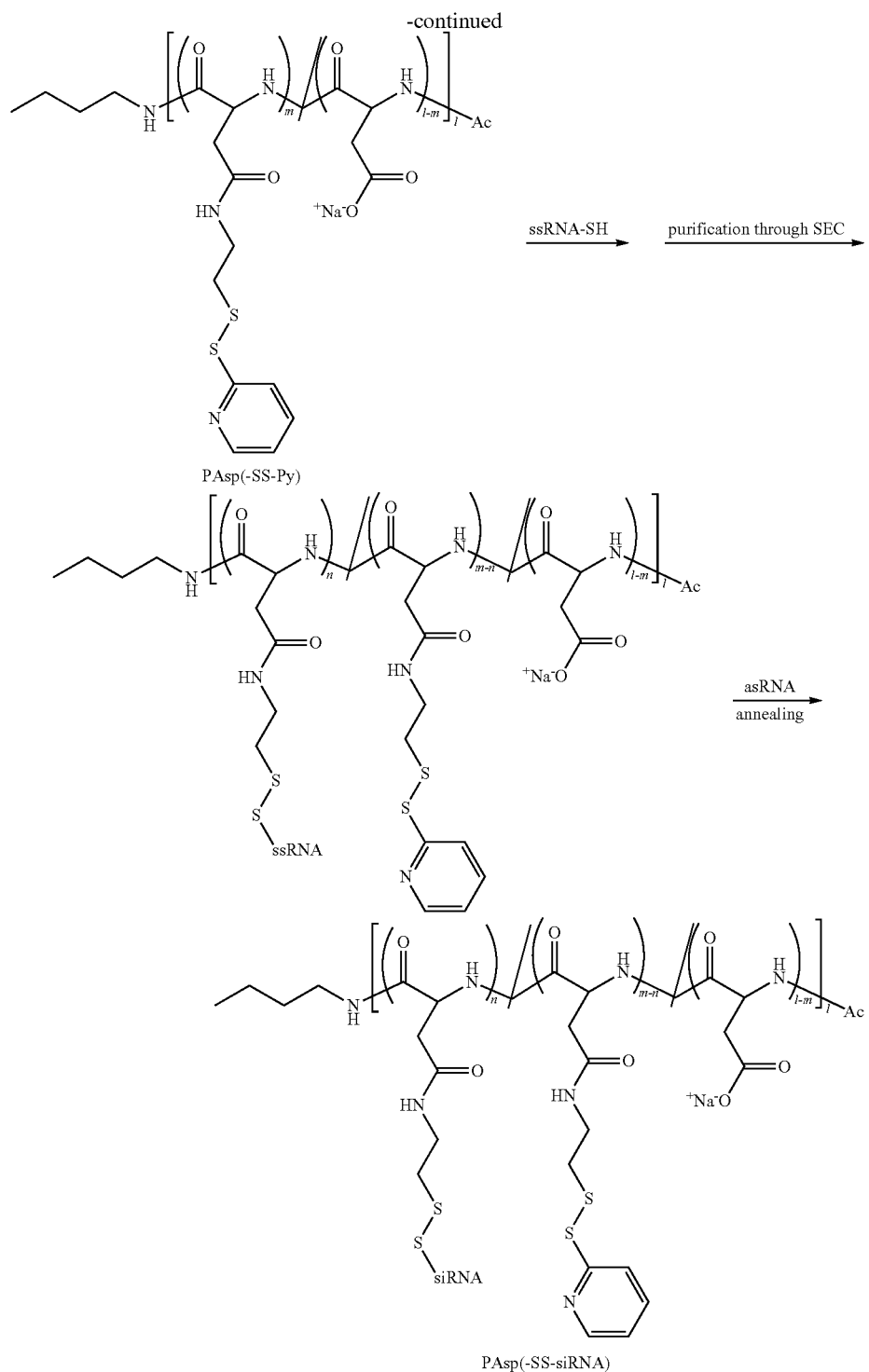

PAsp(-SS-Py)

PAsp(-SS-siRNA)

B. Polyion Complex

A polyion complex (PIC) according to an embodiment of the present invention includes: the anionic polymer described in the section A; and a cationic polymer. Any appropriate polymer may be adopted as the cationic polymer as long as the polymer can form a PIC with the anionic polymer of the present invention. Specific examples of the cationic polymer include polyethylene imine, polyarginine, polylysine, poly-[2-{(2-aminoethyl)amino}-ethyl-aspartamide] (pAsp (DET)), a block co-polymer of polyethylene glycol and polyarginine, a block co-polymer of polyethylene glycol and polylysine, and a block co-polymer of polyethylene glycol and poly-[2-{(2-aminoethyl)amino}-ethyl-aspartamide] (PEG-pAsp(DET)).

The PIC is formed through an electrostatic interaction between the anionic polymer and the cationic polymer. In addition, for example, the use of a diblock co-polymer of PEG and a cationic polymer, such as PEG-pAsp(DET), as the cationic polymer results in the formation of a PIC having a core-shell type micelle structure in which a cationic chain forms a PIC core with the anionic polymer based on its electrostatic property and the like, and a PEG chain having a high affinity to water serves as a shell that covers the core. In this case, siRNA is encapsulated into the core part.

The particle diameter of the PIC may be appropriately set depending on the purposes. The particle diameter of the PIC is, for example, 60 nm to 200 nm. The particle diameter of the PIC may be controlled by adjusting a combination of an anionic polymer and a cationic polymer, a molecular weight of a cationic polymer, and the like.

The PIC of the present invention may be formed at a very high siRNA association number. For example, when a diffusion coefficient D is used as an indicator for the association number, the diffusion coefficient D of the PIC of the present invention in an HEPES buffer is preferably 1/10 to 1/20 of the diffusion coefficient D of the corresponding anionic polymer (anionic polymer of the present invention). On the other hand, the diffusion coefficient D of a PIC of monomeric siRNA and a cationic polymer is about 1/3 of the diffusion coefficient D of siRNA. Thus, according to the present invention, the introduction of siRNA into the side chain through grafting can form a PIC having a markedly large association number as compared to the PIC of monomeric siRNA. In addition, the PIC of the present invention has siRNA introduced in a very large amount into an anionic polymer itself constructing the PIC, and hence the delivery amount of siRNA becomes markedly large by virtue of a synergistic effect with the association number.

When pAsp(DET) is used as the cationic polymer, for example, the PIC of the present invention preferably has an N/P ratio of 2 or more from the viewpoint of improving the stability under a physiological condition and preferably has an N/P ratio of 200 or less from the viewpoint of inhibiting polymer-induced toxicity. The N/P ratio is more preferably 5 to 50, particularly preferably 7 to 30. It should be noted that the N/P ratio refers to a molar ratio of total amino groups in pAsp(DET) to phosphate groups in siRNA.

C. Ternary Polymer Composite

A ternary polymer composite according to an embodiment of the present invention includes: the polyion complex (PIC) described in the section B; and a charge conversional polymer. The charge conversional polymer to be used in the present invention is negatively charged under a neutral condition (extracellularly), and the charge is converted to a positive charge under an acidic condition (in intracellular late endosomes). Thus, the ternary polymer composite of the present invention has a structure in which the outer surface of a core-shell type micelle formed of the PIC is covered with the charge conversional polymer through an electrostatic interaction between the cationic polymer in the PIC and the charge conversional polymer. The covering of the micelle formed of the PIC with the charge conversional polymer can realize lower toxicity and a higher siRNA delivery ratio as compared to the case of the PIC alone.

The charge conversional polymer is represented by the following general formula (II):

[Chem. 8]

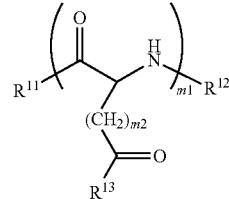
(II)

where: $R^{11}$ and $R^{12}$ each independently represent a hydrogen atom, an unsubstituted or substituted linear or branched $C_1$-$C_{12}$ alkyl group, or a polyethylene glycol chain; $R^{13}$ represents a conjugate of a residue derived from an amine compound having a primary amine, with a compound represented by the following formula (10) or a derivative thereof:

[Chem. 9]

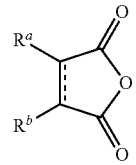
(10)

where: $R^a$ and $R^b$ each independently represent a hydrogen atom or an unsubstituted or substituted alkyl, alkenyl, cycloalkyl, aryl, aralkyl, acyl, heterocyclic ring, heterocyclicalkyl, hydroxyl, alkoxyl, or aryloxy group, with the proviso that $R^a$ and $R^b$ may be bonded together to form an aromatic or cycloalkyl ring with carbon atoms to which $R^a$ and $R^b$ are bonded, respectively, and a bond between the carbon atoms to which $R^a$ and $R^b$ are bonded is single or double; m1 represents an integer of 10 to 500; and m2 represents an integer of 1 to 5.

Any appropriate hydrocarbon group is given as a substituent in the case where $R^a$ and $R^b$ in the formula (10) are substituted. In more detail, the hydrocarbon group maybe a saturated or unsaturated non-cyclic or cyclic hydrocarbon group. When the hydrocarbon group is a non-cyclic hydrocarbon group, the hydrocarbon group maybe linear or branched. Specific examples of the hydrocarbon group include $C_1$-$C_{20}$ alkyl, $C_2$-$C_{20}$ alkenyl, $C_4$-$C_{20}$ cycloalkyl, $C_6$-$C_{18}$ aryl, $C_6$-$C_{20}$ aralkyl, $C_1$-$C_{20}$ alkoxy, and $C_6$-$C_{18}$ aryloxy groups.

The residue derived from an amine compound having a primary amine is preferably represented by the following formula (11) or (12):

—NH—(CH$_2$)$_r$—NH$_2$ (11)

in the formula (11), r represents an integer of 0 to 5; or

—[NH—(CH$_2$)$_{s1}$]$_{t1}$—NH$_2$ (12)

in the formula (12): in [NH—(CH$_2$)$_{s1}$] units, s1's each independently represent an integer of 1 to 5; and t1 represents an integer of 2 to 5. The residue derived from an amine compound having a primary amine is more preferably —NH—(CH$_2$)$_2$—NH$_2$ or —NH—(CH$_2$)$_2$—NH—(CH$_2$)$_2$—NH$_2$.

The compound represented by the formula (10) is preferably at least one compound selected from compounds represented by the following formulae (Ia) to (Ig):

[Chem. 10]

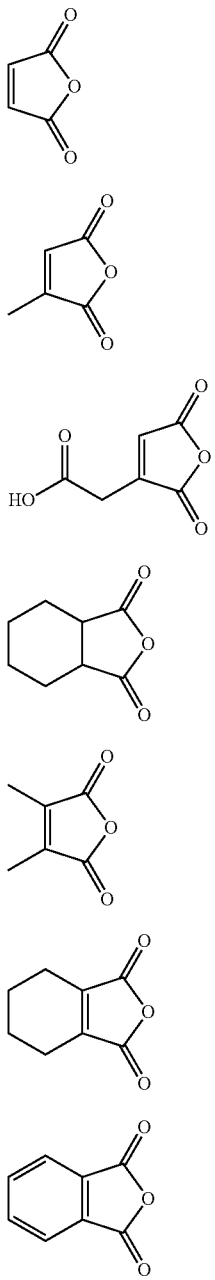

alkyl group is used in place of the carboxyl group, the compound represented by the formula (Ib) or (Ie) in which another alkyl group is used in place of the methyl group, and the compound represented by the formula (Id), (If), (Ig), or the like in which at least one carbon atom in the aromatic or cycloalkyl ring is substituted by a halogen atom.

[Chem. 11]

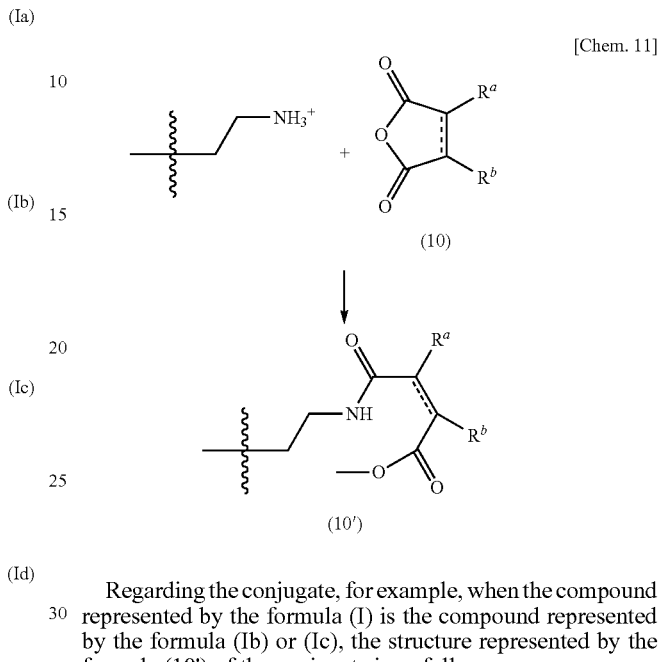

Regarding the conjugate, for example, when the compound represented by the formula (I) is the compound represented by the formula (Ib) or (Ic), the structure represented by the formula (10') of the conjugate is as follows:

[Chem. 12]

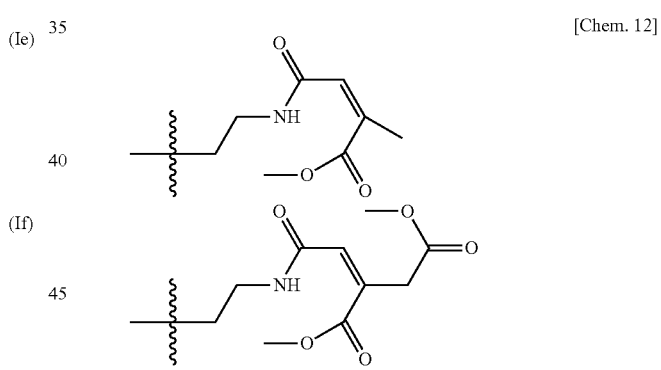

D. Pharmaceutical Composition

A pharmaceutical composition according to an embodiment of the present invention includes: the polyion complex described in the section B; and a pharmaceutically acceptable carrier. A pharmaceutical composition according to another embodiment of the present invention includes: the ternary polymer composite described in the section C; and a pharmaceutically acceptable carrier. Any appropriate carrier may be adopted as the pharmaceutically acceptable carrier depending on administration modes of interest. Specific examples thereof include a diluent, an excipient, purified water, deionized water, an isotonic agent, a pH adjustor, a buffer, a monosaccharide, an oligosaccharide, a sugar alcohol, and polyethylene glycol.

The conjugate of the residue derived from an amine compound having a primary amine, with the compound represented by the formula (10) or the derivative thereof has a structure represented by the following formula (10') through, for example, a bond (covalent bond) between the compound represented by the formula (10) and an amino group in the amine compound. Here, the derivative refers to any appropriate compound derived from the compound represented by the formula (10) as a basic backbone. Examples thereof include the compound represented by the formula (Ic) in which an

EXAMPLES

Hereinafter, the present invention is more specifically described by way of examples. However, the present invention is not limited to these examples. RNA, 5'-thiolated RNA, and 5'-Cy3-labeled RNA used in the following examples were synthesized by Hokkaido System Science Co., Ltd. The sequences of RNA are as follows:

```
(1) siScramble (thiol-modified):
                          (sense strand: SEQ ID NO: 1)
5'-(HSC₆H₁₂-)UUCUCCGAACGUGUCACGUdTdT-3', (antisense strand: SEQ ID NO: 2)
5'-ACGUGACACGUUCGGAGAAdTdT-3';
and (2) siLuc (thiol-modified and Cy3-labeled):
                          (sense strand: SEQ ID NO: 3)
5'-(HSC₆H₁₂-)CUUACGCUGAGUACUUCGAdTdT-3', (antisense strand: SEQ ID NO: 4)
5'-(Cy3-)UCGAAGUACUCAGCGUAAGdTdT-3'.
```

Production Example 1

Synthesis of poly(β-benzyl L-aspartate)

β-Benzyl L-aspartate (hereinafter, referred to as BLA) N-carboxy anhydride (hereinafter, referred to as BLA-NCA) was synthesized according to the procedure described in Bae Y, Nishiyama N, Kataoka K. In vivo antitumor activity of the folate-conjugated pH-sensitive polymeric micelle selectively releasing adriamycin in the intracellular acidic compartments. Bioconj Chem 2007; 18: 1131-1139. Poly(β-benzyl L-aspartate) (for the sake of convenience, in the following production examples, N-protected and deprotected forms are both referred to as PBLA) was synthesized by the ring-opening polymerization of the BLA-NCA using n-butylamine, followed by the acetylation of the N-terminus of the ring-opened polymer using acetic anhydride. The specific procedure is as follows: n-Butylamine (25.0 μL, 0.253 mmol) in dichloromethane (DCM) (2.5 mL) was added to BLA-NCA (6.9 g, 27.9 mmol) dissolved in dimethylformamide (DMF) (4.0 mL), and the mixture was diluted with DCM (36 mL) under an argon atmosphere. The diluted mixture was then stirred at 35° C. for 48 hours. After confirming the completion of monomer consumption from the disappearance of peaks of NCA in IR, acetic anhydride (100 μL, 1.06 mmol) was added to the reaction mixture, and the resultant mixture was stirred at 35° C. for 1 hour to protect a primary amino group at the ω-end of PBLA. The solution was poured into an excess amount of diethyl ether to precipitate PBLA. The collected PBLA was dissolved in DCM (500 mL), and benzene (400 mL) was then added to the PBLA solution. After the removal of DCM by evaporation, the sample was lyophilized to obtain PBLA (4.35 g, 63% yield). The obtained PBLA was found to have a molecular weight distribution (Mw/Mn) of 1.1 by size exclusion chromatography (SEC). In addition, the obtained PBLA was found to have a polymerization degree of 95 by $^1$H NMR.

Production Example 2

Synthesis of poly[N-{N-(2-aminoethyl)-2-aminoethyl}aspartamide]hydrochloride salt An N-{N-(2-aminoethyl)-2-aminoethyl} moiety was introduced into the side chain of PBLA by the aminolysis of a benzyl group in PBLA using diethylenetriamine (DET). The specific procedure is as follows: PBLA (103 mg, 4.95 μmol) lyophilized from a mixture of DCM (5 mL) and benzene (20 mL) was dissolved in NMP (10 mL) under an argon atmosphere. Meanwhile, DET (2.4 mL, 23.5 mmol, 50 eq. with respect to a benzyl group in PBLA) was dissolved in NMP (10 mL). The PBLA solution was then added to the DET solution, and the mixture was stirred at 0° C. for 1 hour under an argon atmosphere. The reacted solution was added dropwise to a 1 M HCl aqueous solution (50 mL) at 0° C. for neutralization, and the mixed solution was then dialyzed against a 0.01 M HCl aqueous solution for 24 hours and de-ionized water for an additional 24 hours using a dialysis membrane with a molecular weight cut off of 6,000 to 8,000 Da. The dialysed solution was lyophilized to obtain poly[N-{N-(2-aminoethyl)-2-aminoethyl}aspartamide]hydrochloride salt (hereinafter, referred to as pAsp(DET)) (98.0 mg, 79% yield). The quantitative conversion of PBLA to pAsp(DET) was confirmed by $^1$H NMR (D₂O).

Production Example 3

Synthesis of poly(aspartic acid) sodium salt

The benzyl ester group of the side chain in PBLA was deprotected to obtain poly(aspartic acid) sodium salt (hereinafter, referred to as pAsp). The specific procedure is as follows: lyophilized PBLA (98.0 mg, 4.71 nmol) was dissolved in a 0.1 M NaOH aqueous solution (5 mL), and the solution was then stirred at room temperature for 1 hour under an air atmosphere. The solution was dialyzed against de-ionized water for 48 hours using a dialysis membrane with a molecular weight cut off of 6,000 to 8,000 Da, followed by lyophilization to obtain pAsp (52.3 mg, 85% yield). The complete deprotection was confirmed by $^1$H NMR (D₂O).

Production Example 4

Synthesis of 2-(2-pyridyldithio)ethylamine hydrochloride salt 2,2'-Dithiodipyridine (11 g, 50 mmol) was dissolved in methanol (75 mL) containing glacial acetic acid (8 mL). To the solution was added dropwise a solution of 2-aminoethanethiol hydrochloride (1.14 g, 10 mmol) in methanol (20 mL) over a period of 30 minutes under an argon atmosphere. The reaction mixture was stirred at room temperature for an additional 24 hours under an argon atmosphere and then concentrated under reduced pressure to give yellow oil (10 to 15 mL). The oil was precipitated dropwise into an excess amount of diethyl ether, and the precipitate was then redissolved in methanol (20 mL), followed by the repetition of the precipitation cycle several times to remove unreacted 2,2'-dithiodipyridine, to obtain 2-(2-pyridyldithio)ethylamine hydrochloride salt (hereinafter, referred to as PDTA) as a colorless solid. PDTA was identified by $^1$H NMR (D₂O).

Production Example 5

Synthesis of poly(aspartic acid) modified with 2-(2-pyridyldithio)ethylamine

Poly(aspartic acid) modified with 2-(2-pyridyldithio)ethylamine at the side chain (pAsp(-SS-Py)) was synthesized through a condensation reaction of a carboxyl group in pAsp with a primary amino group in PDTA. A solution of pAsp (20.0 mg, Asp residue: 0.146 mmol) in water (3 mL) was mixed with a solution of a triazine-based condensation agent DMT-MM (8.07 mg, 0.0292 mmol) in water (1 mL). The pAsp solution was left to stand at room temperature for 30 minutes under an air atmosphere. After that, a solution of PDTA (7.81 mg, 0.0350 mmol) in water (1 mL) was added, and the mixture was stirred at room temperature for 3 hours under an air atmosphere. The product was purified by dialysis against de-ionized water for 48 hours (4 times) (molecular weight cut off: 3,500 Da) and collected by lyophilization (21.8 mg, 95% yield). The introduction ratio of a pyridyl group in a carboxylate side chain of pAsp was determined to be 15% by $^1$H NMR ($D_2O$). This corresponds to the introduction of about 14 pyridyl disulfide moieties per pAsp chain.

Example 1

Synthesis of poly(aspartic acid) grafted with siRNA through disulfide bond

Sense strand RNA (ssRNA) was introduced into pAsp(-SS-Py) by a substitution reaction with a thiol group at the 5'-chain end of ssRNA-SH, followed by size exclusion chromatographic purification to remove unreacted products and 2-thiopyridone. The pAsp[pAsp(-SS-ssRNA)] grafted with sense strand RNA was annealed with antisense strand RNA (asRNA) or Cy3-labeled asRNA (Cy3-asRNA) to obtain poly (aspartic acid) with grafted siRNA through a disulfide bond [pAsp(-SS-siRNA)] as a final product. The brief protocol was as follows: pAsp(-SS-Py) (0.302 mg, 0.0200 mmol) and ssRNA-SH (2.00 mg, 0.300 mmol, 1 eq. with respect to a pyridyl group) were dissolved in 5 mL of 10 mM HEPES (pH 7.3) containing 500 mM NaCl and stirred for 24 hours in the dark under an air atmosphere. The crude product was purified by size exclusion chromatography (SEC). From the SEC chart, the substitution degree of a pyridyl disulfide group into ssRNA having a disulfide bond was calculated to be 30%. This corresponds to the introduction of about 4 ssRNA molecules per pAsp chain. Next, the obtained pAsp(-SS-ssRNA) was desalted through repeated centrifugal ultrafiltration using AmiconUltra15 (manufactured by Millipore, molecular weight cut off: 3,000 Da), followed by annealing with asRNA. The annealing was carried out by heating a mixture of pAsp(-SS-ssRNA) with asRNA at 95° C. for 10 minutes in the dark, followed by gradual cooling to room temperature in the dark (1.24 mg, 83% yield).

In the same manner as described above, pAsp(-SS-ssRNA) was annealed with Cy3-asRNA to obtain Cy3-labeled pAsp (-SS-siRNA) [pAsp(-SS-Cy3-siRNA)].

Example 2

Preparation of polyion complex from polycation (pAsp(DET)) and pAsp(-SS-siRNA)

pAsp(DET) was used as a polycation (cationic polymer) to prepare a polyion complex (PIC) from pAsp(DET) and pAsp (-SS-siRNA) at an N/P ratio of 20. Here, the N/P ratio is a molar ratio of total amino groups in pAsp(DET) to phosphate groups in siRNA. Specifically, 20 μL of a solution of pAsp(-SS-siRNA) in a 10 mM HEPES buffer (pH 7.3) (siRNA concentration=15 M) were mixed with 10 μL of a solution of pAsp(DET) in the same buffer, and the mixture was incubated at 4° C. overnight (final siRNA concentration=10 μM).

Example 3

Preparation of polyion complex from polycation (PEI) and pAsp(-SS-siRNA)

A PIC was prepared in the same manner as in Example 2 except that a commercially available linear polyethylene imine (PEI)-based transfection reagent ExGen500 was used as the polycation.

Example 4

Preparation of polyion complex from polycation (PEI) and pAsp(-SS-siRNA)

A PIC was prepared in the same manner as in Example 2 except that PEI (Mw=22,000) was used as the polycation and the N/P ratio was set to 6.

Example 5

Preparation of Polyion Complex from Polycation (PEG-pAsp(DET)) and pAsp(-SS-siRNA)

A PIC was prepared in the same manner as in Example 2 except that PEG-pAsp(DET) was used as the polycation. Here, PEG-pAsp(DET) is a block co-polymer of polyethylene glycol (Mw=12,000) and pAsp(DET) (Mw=20,000).

Comparative Example 1

A PIC was prepared in the same manner as in Example 2 except that monomeric siRNA was used in place of pAsp(-SS-siRNA).

Comparative Example 2

A PIC was prepared in the same manner as in Example 3 except that monomeric siRNA was used in place of pAsp(-SS-siRNA).

Comparative Example 3

A PIC was prepared in the same manner as in Example 4 except that monomeric siRNA was used in place of pAsp(-SS-siRNA).

Comparative Example 4

A PIC was prepared in the same manner as in Example 5 except that monomeric siRNA was used in place of pAsp(-SS-siRNA).

Evaluation 1

Polyacrylamide Gel Electrophoresis of pAsp(-SS-siRNA)

The pAsp(-SS-siRNA) obtained in Example 1 was subjected to polyacrylamide gel electrophoresis (PAGE). As a result, no band was observed at the position of monomeric siRNA, while a plurality of retarded bands were observed (FIG. 1), suggesting that siRNA was introduced into the side chain of pAsp to form an siRNA-grafted polymer. The addition of a reductive reagent, dithiothreitol (DTT), to the pAsp (-SS-siRNA) solution induced the band reconstruction of monomeric siRNA with the disappearance of the retarded bands, indicating siRNA release via the cleavage of a disulfide bond in a reductive environment.

Evaluation 2

Fluorescence Correlation Spectroscopy Measurement of PICs

A PIC was prepared in the same manner as in Comparative Example 1 except that Cy3-siRNA was used in place of siRNA. The obtained PIC was diluted with an HEPES buffer, an HEPES buffer containing 50 mM DTT, a DMEM containing 10% FBS, and a DMEM containing 10% FBS and 50 mM DTT to prepare samples each having a final siRNA concentration of 100 nM. The samples each containing DTT were incubated at 4° C. overnight after the dilution. Further, a PIC was prepared in the same manner as in Example 2 except that pAsp(-SS-Cy3-siRNA) was used in place of pAsp (-SS-siRNA). Also for the PIC, samples were prepared in the same manner as described above. Hereinafter, PICs labeled with Cy3 are described as "labeled PIC of Example 2" and the like according to the corresponding numbers of examples and comparative examples.

Fluorescence correlation spectroscopy (FCS) measurement was done using LSM-510-META manufactured by Carl Zeiss for the samples obtained in the above. The measurement was repeated 10 times at room temperature with a sampling time of 20 seconds. For the respective samples, diffusion coefficients D were determined. Table 1 shows the results.

TABLE 1

|  | HEPES | Culture medium |
|---|---|---|
| PAsp (-SS-Cy3-siRNA) | 28.8 ± 0.2 | 33.2 ± 0.3 |
| PAsp (-SS-Cy3-siRNA)/PAsp (DET) | 2.17 ± 0.19 | 1.57 ± 0.05 |
| PAsp (-SS-Cy3-siRNA)/PAsp (DET) + DTT | 30.6 ± 0.3 | 54.8 ± 0.7 |
| monomeric Cy3-siRNA | 66.1 ± 0.8 | 68.4 ± 0.9 |
| monomeric Cy3-siRNA/PAsp (DET) | 24.0 ± 0.2 | 66.6 ± 0.8 |

As clear from Table 1, in the HEPES buffer, the diffusion coefficient D of the labeled PIC of Example 2 is about 1/14 of the D of the labeled polymer of Example 1. In contrast, the diffusion coefficient D of the labeled PIC of Comparative Example 1 is only about 1/3 of the D of monomeric Cy3-siRNA. This suggests that the PIC of Example of the present invention has a markedly high association number as compared to the PIC of Comparative Example. In addition, the diffusion coefficient D of the labeled PIC of Comparative Example 1 in a culture medium (DMEM) is about three times as large as the D in the HEPES buffer and is close to the D of free monomeric Cy3-siRNA (in any of the culture medium and buffer), suggesting that the labeled PIC of Comparative Example 1 prepared in the HEPES buffer was dissociated in the culture medium, probably due to higher ionic strength and interaction with serum proteins. In contrast, the diffusion coefficient D of the PIC of Example 2 in the culture medium is similar to that in the buffer, suggesting that the PIC is stable even in the culture medium. On the other hand, in a reductive environment containing DTT, the D of the PIC of Example 2 in the culture medium shows an increase to a similar level to the D of free monomeric Cy3-siRNA, suggesting the release of Cy3-siRNA from the PIC via the cleavage of a disulfide bond in pAsp(-SS-Cy3-siRNA).

Evaluation 3

Stability of PICs Against Polyanion Exchange Reaction

A solution (2 µL) of the PIC of Comparative Example 1 containing 0.1 µg of monomeric siRNA was mixed with heparin solutions (0, 0.5, 1.0, 1.5, 2.0, and 2.5 µg in 3 µL of an HEPES buffer). The mixed solutions were then incubated at room temperature for 30 minutes. The solutions had final heparin concentrations of 0, 0.1, 0.2, 0.3, 0.4, and 0.5 µg/µL, respectively. Also for the PIC of Example 2 containing 0.1 µg of pAsp(-SS-siRNA), solutions were prepared in the same manner as described above. In addition, the above-mentioned solutions each supplemented with DTT were also prepared. The stability of the PICs in the respective solutions thus prepared was analyzed by agarose gel electrophoresis. FIGS. 2A to 2C show the results. Complete siRNA release from the PIC of Example 2 required 0.4 µg/µL of heparin (FIG. 2B), which was twice as large as the amount (0.2 µg/µL: FIG. 2A) of heparin necessary for complete siRNA release from the PIC of Comparative Example 1. In contrast, in the presence of DTT, 0.2 µg/µL of heparin was enough to allow complete siRNA release from the PIC of Example 2 (FIG. 2C), which was equivalent to the amount of heparin necessary for complete siRNA release from the PIC of Comparative Example 1. Those results reveal that the grafting of siRNA to a pAsp backbone can enhance the stability of PICs, and as a result, siRNA can be smoothly and selectively released from the PIC of the present invention depending on a redox potential.

Evaluation 4

Cellular Uptake of siRNAs

Figure 3B:
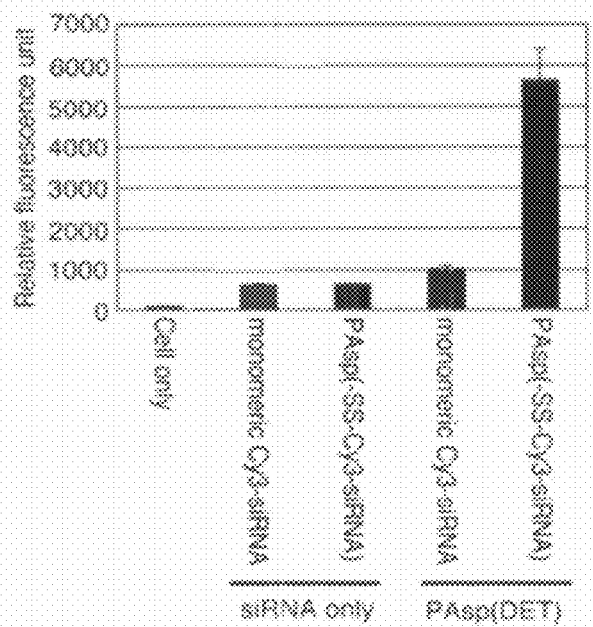

The uptake of the PIC of Example 2 or the PIC of Comparative Example 1 by murine melanoma B16F10 cells was examined by flow cytometry. The specific procedure is as follows: murine melanoma B16F10-Luc cells expressing luciferase (Caliper LifeScience) were seeded onto 12-well culture plates (20,000 cells/well), followed by 24-hour incubation in a DMEM containing 10% FBS (1 mL/well). Monomeric Cy3-siRNA, PAsp(-SS-Cy3-siRNA), and their PAsp (DET) PICs (i.e., the labeled PIC s of Example 2 and Comparative Example 1) were applied to the respective wells (final siRNA concentration=100 nM). After 12 hours, the cells were washed three times with PBS and collected by trypsinization. The collected cells were centrifuged at 100 g and resuspended in PBS. The fluorescence intensity was examined using a BD LSR apparatus manufactured by BD Bioscience. The cells incubated with the labeled PIC of Example 2 showed five times higher fluorescence intensity than the cells incubated with the labeled PIC of Comparative Example 1 (FIGS. 3A and 3B). The results reveal that the grafting of siRNA to a pAsp backbone remarkably improves the cellular uptake of siRNA, probably due to the formation of stable PICs even in the culture medium.

Evaluation 5

Intracellular Distribution of siRNAs

B16F10-Luc cells were seeded onto glass dishes (20,000 cells in 0.2 mL of a DMEM containing 10% FBS) and incubated for 24 hours. Next, the PIC of Comparative Example 1 and the PIC of Example 2 were applied to the respective wells (final siRNA concentration=100 nM) and further incubated for 12 hours. After staining acidic late endosomes and lysosomes with Lysotracker Green and cell nuclei with Hoechst 33342, confocal laser scanning microscopic (CLSM) observation was performed. FIGS. 4A and 4B show the results. Microscopic images shown in the figures have red and yellow pixels, corresponding to Cy3 signals from cytoplasmic regions and from late endosomes/lysosomes stained by LysoTracker Green, respectively.

The number of fluorescence pixels derived from Cy3-siRNA (observed as red and yellow pixels) in the cells incubated with the PIC of Example 2 was larger than that in the cells incubated with the PIC of Comparative Example 1 (FIGS. 4A and 4B), consistent with the results of flow cytometry. In addition, much larger fractions of red pixels than yellow pixels are clearly observed in the cells incubated with the PIC of Example 2, suggesting effective endosomal escape of Cy3-siRNA into cytoplasm. The endosomal escaping efficacy into cytoplasm was then evaluated by calculating the colocalization ratio of Cy3-siRNA with late endosomes/lysosomes, based on the numbers of red and yellow pixels in the CLSM images (FIG. 4C). The colocalization ratio was calculated to be about 30% and about 60% for the cells treated with the PIC of Example 2 and for the cells treated with the PIC of Comparative Example 1, respectively, indicating more efficient endosomal escape in the PIC of Example 2 than the PIC of Comparative Example 1. Such excellent endosomal escape in the PIC of Example 2 is consistent with efficient cellular uptake of siRNAs (Evaluation 4 above).

Evaluation 6

Gene Silencing Effect and Cytotoxicity of PICs

Figure 5A:
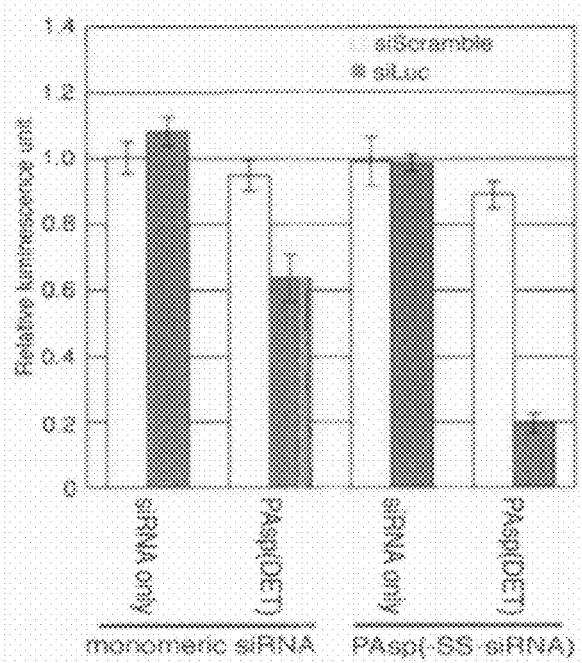
FIG. 5A is a graph showing the gene silencing efficiency of the PIC of Example 2 or the PIC of Comparative Example 1.
Figure 6:
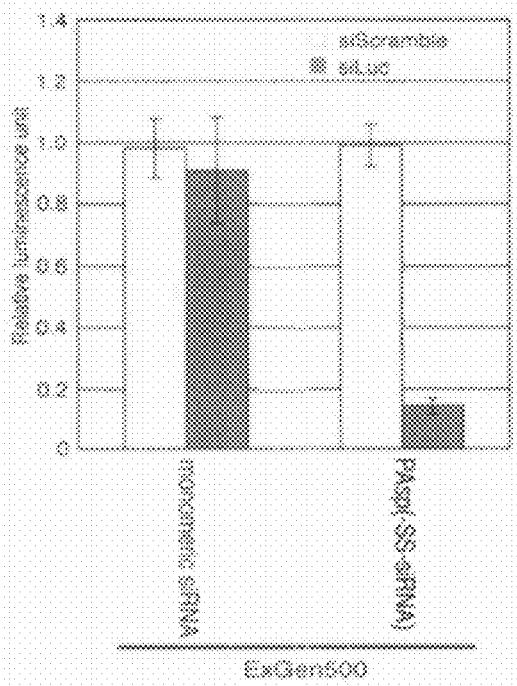
FIG. 6 is a graph showing the gene silencing efficiency of a PIC of Example 3 or a PIC of Comparative Example 2.

B16F10-Luc cells were seeded onto 24-well plates (10,000 cells/well), followed by 24-hour incubation in a DMEM containing 10% FBS (0.5 mL/well). Next, monomeric Cy3-siRNA, the anionic polymer of Example 1, and their pAsp(DET) PICs (i.e., the PICs of Example 2 and Comparative Example 1) were applied to the respective wells (final siRNA concentration=100 nM). After 48 hours, the cells were washed with 0.5 mL of PBS and lysed with 0.2 mL of a cell culture lysis buffer manufactured by Promega. The luciferase activity of the lysates was determined from the photoluminescence intensity using a Luciferase Assay System manufactured by Promega and a Mithras LB 940 manufactured by Berthold Technologies. The relative luminescence unit (RLU) was calculated from the obtained luminescence intensity as a percentage to control wells without siRNAs. FIG. 5A shows RLUs from the cells after 48-hour incubation with the PICs containing siRNA for luciferase (siLuc, targeting sequence) or siRNA for a negative control (siScramble, non-targeting sequence). The gene silencing efficiency of the PIC of Example 2 was about 80%, which was much higher than the gene silencing efficiency of the PIC of Comparative Example 1 (about 30%). In addition, similar results were also obtained in the PIC of Example 3 and the PIC of Comparative Example 2 each using PEI as a polycation (FIG. 6), indicating that an effect obtained using the anionic polymer of the present invention is not limited to a PIC using pAsp(DET) as a polycation. In addition, the PIC derived from pAsp(-SS-siScramble) or monomeric siScramble showed no decrease in luciferase expression, confirming that the gene silencing is target-specific.

Figure 5B:
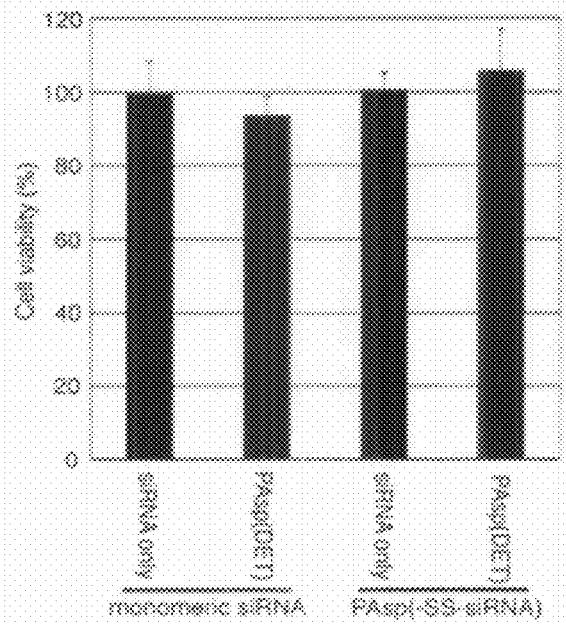
FIG. 5B is a graph showing the results of examination by MTT assay for the cytotoxicity of the PIC of Example 2 or the PIC of Comparative Example 1.

The cytotoxicity of monomeric siRNA, the anionic polymer of Example 1, and their pAsp(DET) PICs (i.e., the PICs of Example 2 and Comparative Example 1) was examined by MTT assay under the same conditions as in the above-mentioned gene silencing study (FIG. 5B). As a result, all of the examined systems, including the PIC of Example 2, showed no significant decrease in cell viability.

Evaluation 7

Evaluation of IFN-α Production

Figure 7:
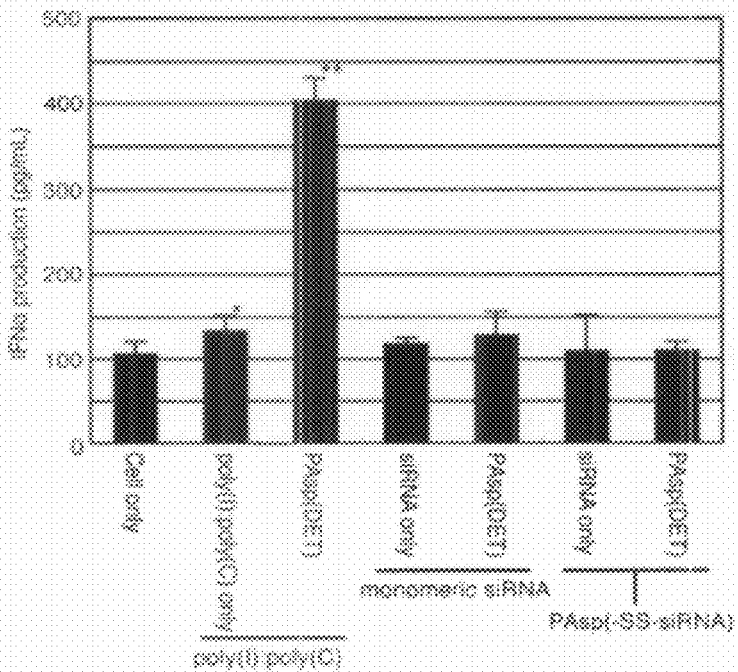
FIG. 7 is a graph showing the results of examination by enzyme-linked immunosorbent assay (ELISA) for the interferon-α production of a variety of PICs including the PIC of Example 2 and the PIC of Comparative Example 1.

Under the same conditions as in the gene silencing study in Evaluation 6 above, B16F10-Luc was incubated with monomeric siRNA, pAsp(-SS-siRNA), poly (I):poly (c), and their pAsp(DET) PICs for 48 hours (transfection amount of poly (I):poly (c) to each well=650 ng (the same amount as the weight of siRNA), N/P ratio of 20 for poly (I):poly (c)/pAsp (DET) PIC). Next, 100 μL of the culture medium in each well was collected to evaluate interferon-α production by enzyme-linked immunosorbent assay (ELISA). Poly (I):poly (c) and its pAsp(DET) PIC were each used as a positive control. It should be noted that poly (I):poly (c) was purchased from Sigma-Aldrich Co. In the ELISA study, a Mouse Interferon-α ELISA Kit (manufactured by PBL InterferonSource) was used according to the manufacturer's protocol. FIG. 7 shows the results. There were no observed differences in INF-α production between non-treated cells and cells treated with the PIC of Example 2, whereas poly (I):poly (c) and especially its pAsp(DET) PIC obviously stimulated INF-α production.

Evaluation 8

Dependency of Gene Silencing Effect on Chain Length

ExGen500 was used as a polycation to prepare PICs formed of the polycation with monomeric siRNA, $pAsp_{100}$ (SEQ ID NO: 5) (-SS-siRNA), and $pAsp_{200}$ (SEQ ID NO: 6) (-SS-siRNA). Here, $pAsp_{100}$ (SEQ ID NO: 5) (-SS-siRNA) is a product obtained in Example 1, and $pAsp_{200}$ (SEQ ID NO: 6) (-SS-siRNA) is a product obtained in the same manner as in Example 1 using PBLA having a polymerization degree of 195 obtained according to Production Example 1. The PICs were formed at an N/P ratio of 6 according to the manufacturer's protocol. The number of siRNA molecules included per molecule of $pAsp_{100}$ (SEQ ID NO: 5) (-SS-siRNA) is 4 on average, and the number of siRNA molecules included per molecule of $pAsp_{200}$ (SEQ ID NO: 6) (-SS-siRNA) is 8 on average.

Figure 8:
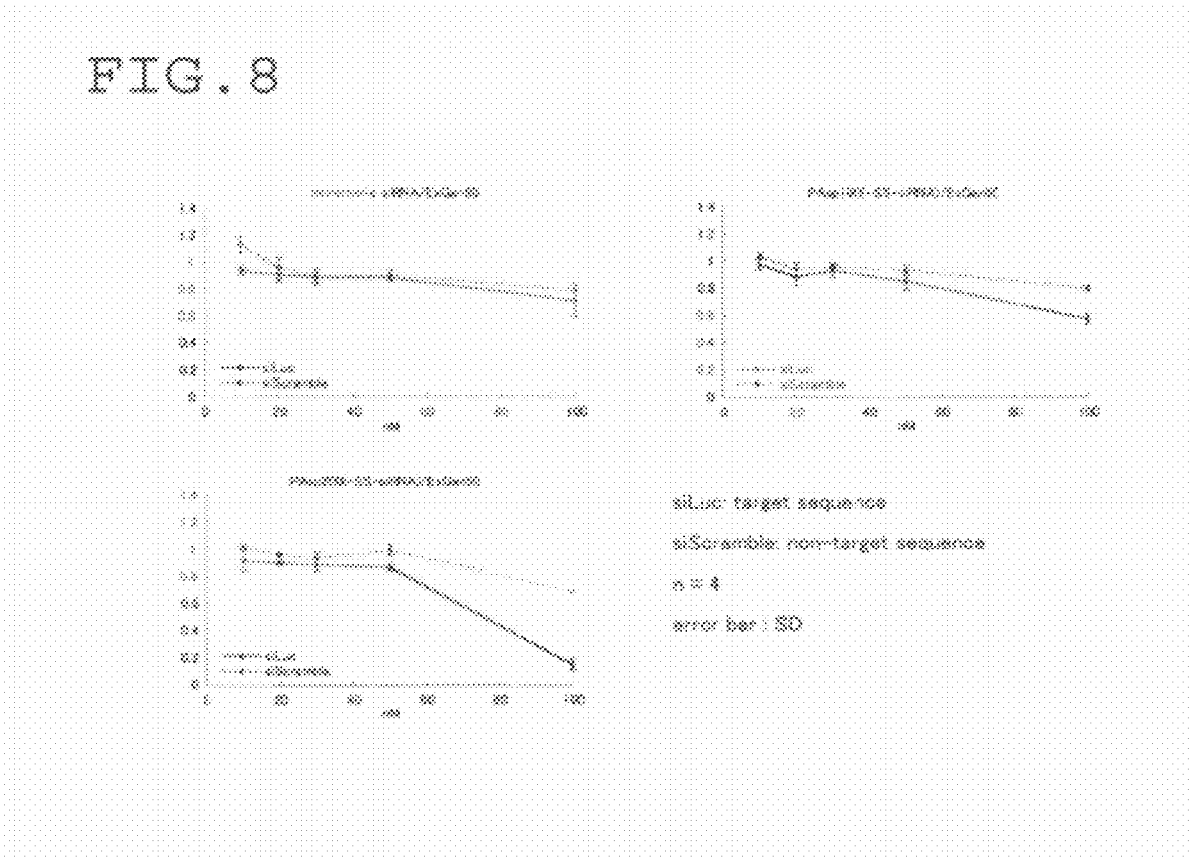
FIG. 8 is a graph showing the results of examination for the dependency of a gene silencing effect on a chain length of an anionic polymer.

Murine melanoma cells (B16F10-Luc) expressing luciferase were seeded onto 24-well plates (10,000 cells/well), followed by 24-hour incubation. The PICs were applied to the respective wells at siRNA concentrations shown in FIG. 8 and further incubated for 48 hours. After that, the luciferase activity was determined from the photoluminescence intensity in the same manner as in Evaluation 6. FIG. 8 shows the results. The figure suggests that the use of a longer pAsp chain leads to a more efficient gene silencing effect.

Evaluation 9

Figure 9A:
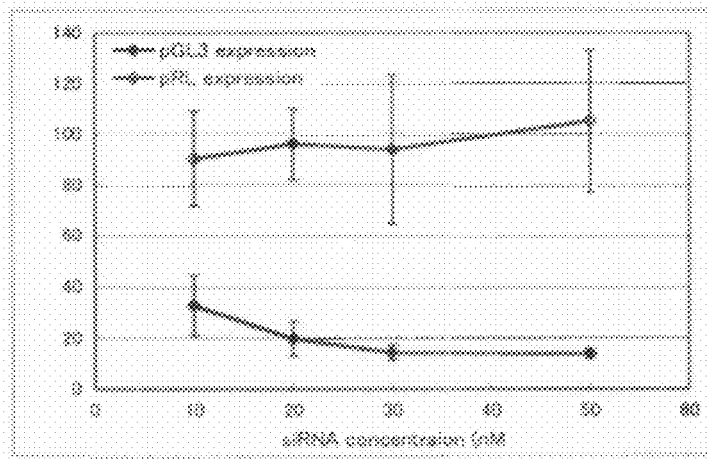
FIGS. 9A and 9B are graphs showing the results of knockdown assay for the PIC of Example 2 and the PIC of Comparative Example 1, respectively.
Figure 9B:
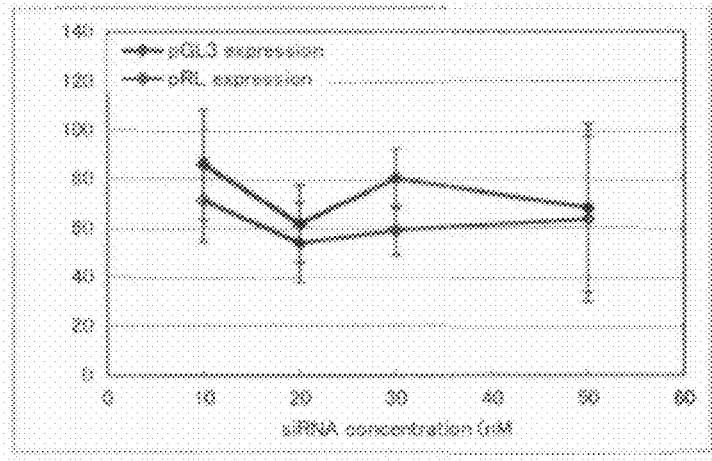

Knockdown Assay (1)
Firefly luciferase-expressing plasmid DNA (pGL3) and sea pansy luciferase-expressing plasmid DNA (pRL) were transfected into cultured human hepatoma cells (Huh-7) using a cationic lipid for gene introduction, lipofectamin 2000 (manufactured by Invitrogen), according to the manufacturer's protocol. In this evaluation, pGL3 was used as a knockdown target gene and pRL was used as a control. 4 hours after transfection of plasmid DNA, the culture medium was replaced with a fresh culture medium, and the PIC of Example 2 was then transfected (siRNA concentration=10 to 50 nM). After further 44-hour incubation, the amount of luciferase was quantified using a Dual-Luciferase Reporter Assay System (manufactured by Promega) (FIG. 9A). In addition, the amount of luciferase was quantified in the same manner as described above except that the PIC of Comparative Example 1 was used (FIG. 9B). As clear from FIG. 9A, the PIC of Example 2 suppressed only pGL3 expression with no influence on pRL expression, suggesting that the PIC of Example 2 did not adversely affect cellular homeostasis. In contrast, as clear from FIG. 9B, the PIC of Comparative Example 1 did not significantly suppress pGL3 expression.

Figure 10A:
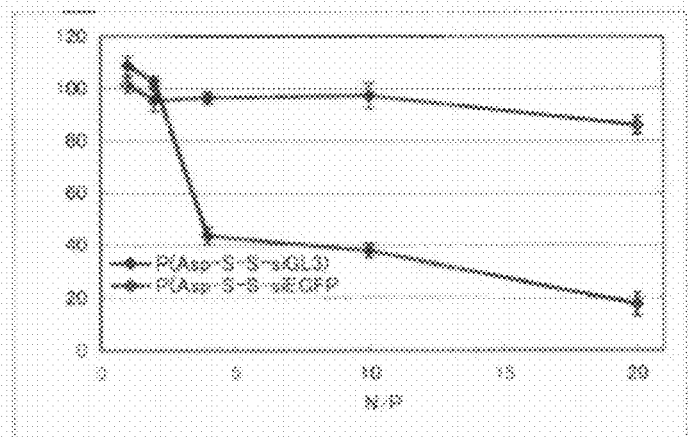
FIGS. 10A and 10B are graphs showing the results of knockdown assay for the PIC of Example 2 and the PIC of Comparative Example 1, respectively.
Figure 10B:
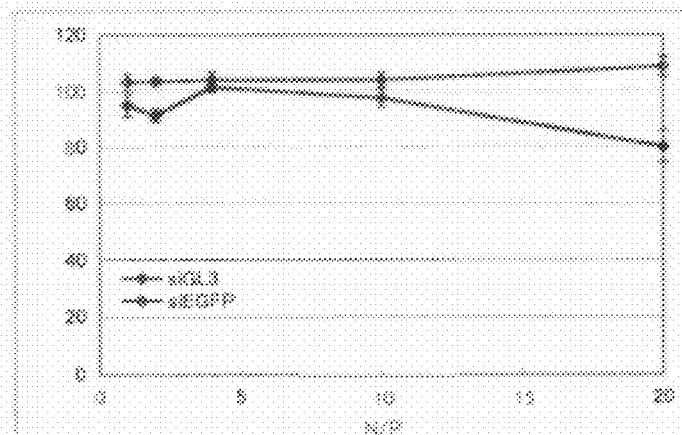

Gene knockdown assay was conducted on a cell line stably expressing a GL3 luciferase gene, murine melanoma cells (B16F10-Luc). pAsp(-SS-siEGFP) having introduced therein an EGFP sequence was used as a control. The cells were transfected with the PIC corresponding to Example 2 or the PIC corresponding to Comparative Example 1 at a plurality of N/P ratios and a final siRNA concentration of 100 nM. 48 hours after transfection, the amount of luciferase was quantified in the same manner as described above (FIGS. 10A and 10B). As clear from FIG. 10A, the PIC corresponding to Example 2 remarkably suppressed GL3 expression at an N/P ratio of 4 or more. The results reveal that the PIC corresponding to Example 2 exhibits a sequence-specific gene knockdown effect without cytotoxicity. In contrast, as clear from FIG. 10B, the PIC corresponding to Comparative Example 1 did not significantly suppress GL3 expression.

Knockdown Assay (2)

Figure 11A:
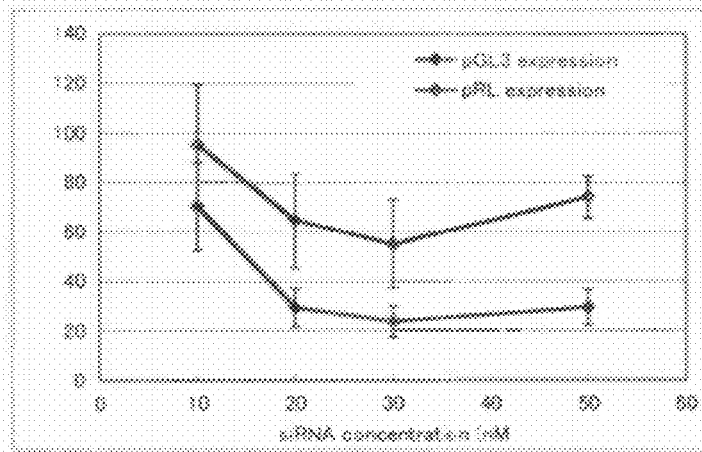
FIGS. 11A and 11B are graphs showing the results of knockdown assay for a PIC of Example 4 and a PIC of Comparative Example 3, respectively.
Figure 11B:
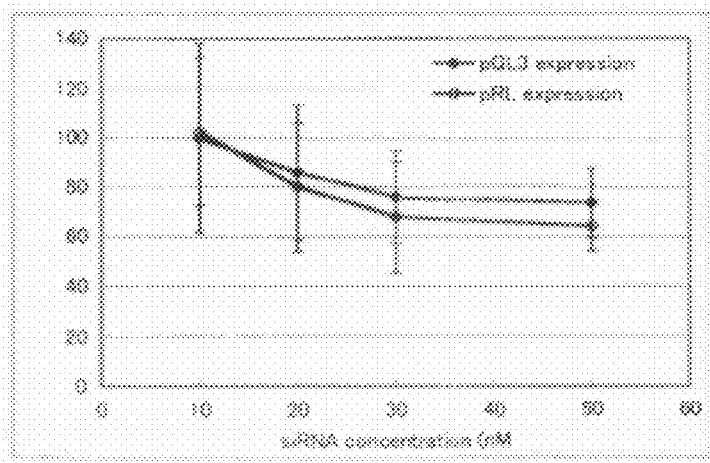

A study was performed in the same manner as in the knockdown assay (1) except that the PICs of Example 4 and Comparative Example 3 were used. FIG. 11A shows the results of the PIC corresponding to Example 4, and FIG. 11B shows the results of the PIC corresponding to Comparative Example 3. As clear from FIG. 11A, the PIC corresponding to Example 4 more effectively suppressed GL3 expression than pRL. In contrast, as clear from FIG. 11B, the PIC corresponding to Comparative Example 3 did not specifically suppress GL3 expression.

Knockdown Assay (3)

A study was performed in the same manner as in the knockdown assay (1) except that the PIC of Example 5 was used. FIG. 12 shows the results. As clear from FIG. 12, the PIC from pAsp(-SS-siGL3) suppressed GL3 expression to a greater extent at an N/P ratio of 4 or more as the ratio became larger. In contrast, the PIC from pAsp(-SS-siEGFP) did not alter GL3 expression. Those results reveal that the PICs according to Examples of the present invention each have a cell-specific gene knockdown effect with low cytotoxicity.

INDUSTRIAL APPLICABILITY

The anionic polymer, polyion complex, ternary polymer composite, and pharmaceutical composition of the present invention can be suitably used in the fields of pharmaceuticals, medical treatments, and the like.

SEQUENCE LISTING FREE TEXT

SEQ ID NO: 1: sense strand siRNA against negative control

SEQ ID NO: 2: antisense strand siRNA against negative control

SEQ ID NO: 3: sense strand siRNA against luciferase

SEQ ID NO: 4: antisense strand siRNA against luciferase

The invention claimed is:

1. An anionic polymer, comprising:
   a main chain which comprises a repeating unit having a carboxyl group; and
   a side chain which is bonded to the carboxyl group in the main chain and which is represented by the following formula:

-A-B—X where: A represents a residue having one or more aminoethyl bonds; B represents an in vivo cleavable bond; and X represents a small RNA.

2. The anionic polymer of claim 1, wherein the main chain comprises at least one selected from the group consisting of a polyamino acid having a carboxyl group, a polyvinyl having a carboxyl group, a polyester having a carboxyl group, a polysaccharide having a carboxyl group, and a dendrimer (cascade polymer) having a carboxyl group.

3. The anionic polymer of claim 1, wherein the in vivo cleavable bond is a disulfide bond, an acetal bond, or a hydrazone bond.

4. The anionic polymer of claim 1, which is represented by formula (I):

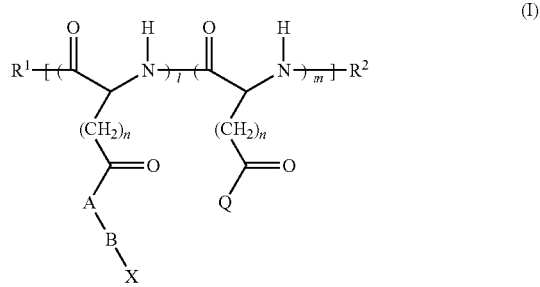

where: $R^1$ and $R^2$ each independently represent a hydrogen atom, an unsubstituted or substituted linear or branched $C_1$-$C_{12}$ alkyl group, or a polyethylene glycol chain; A represents a residue having one or more aminoethyl bonds; B represents an in vivo cleavable bond; Q represents a hydroxyl group or a residue having one or more aminoethyl bonds in which an aminoethyl bond is substituted by a hydroxyl group; X represents a small RNA; l is an integer of 1 to 500; m is an integer of 1 to 499; and n is an integer of 1 to 5, wherein a sum of l and m is 10 to 500, and repeating units represented by l and m are arranged at random.

5. The anionic polymer of claim 4, wherein A represents —NH—$(CH_2)_2$— and Q represents —OH.

6. The anionic polymer of claim 4, wherein l is an integer of 2 or more.

7. A polyion complex, comprising:
the anionic polymer of claim 1; and
a cationic polymer selected from the group consisting of polyethylene imine, polyarginine, polylysine, poly-[2-{(2-aminoethyl)amino}-ethyl-aspartamide] (pAsp(DET)), a block co-polymer of polyethylene glycol and polyarginine, a block co-polymer of polyethylene glycol and polylysine, and a block co-polymer of polyethylene glycol and poly-[2-{(2-aminoethyl)amino}-ethyl-aspartamide] (PEG-pAsp(DET)).

8. A ternary polymer composite, comprising:
the polyion complex of claim 7; and
a charge conversional polymer represented by formula (II):

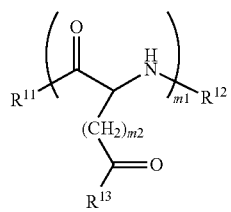

(II)

where: $R^{11}$ and $R^{12}$ each independently represent a hydrogen atom, an unsubstituted or substituted linear or branched $C_1$-$C_{12}$ alkyl group, or a polyethylene glycol chain; $R^{13}$ represents a conjugate of an amine compound residue having a primary amine, with a compound represented by formula (10):

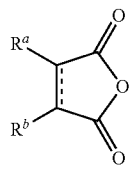

(10)

where: $R^a$ and $R^b$ each independently represent a hydrogen atom or an unsubstituted or substituted alkyl, alkenyl, cycloalkyl, aryl, aralkyl, acyl, heterocyclic ring, heterocyclic-alkyl, hydroxyl, alkoxyl, or aryloxy group, wherein $R^a$ and $R^b$ may be bonded together to form an aromatic or cycloalkyl ring with carbon atoms to which $R^a$ and $R^b$ are bonded, respectively, and a bond between the carbon atoms to which $R^a$ and $R^b$ are bonded is single or double;
m1 represents is an integer of 10 to 500; and m2 represents is an integer of 1 to 5.

9. The ternary polymer composite of claim 8, wherein the amine compound residue having a primary amine is represented by formula (11) or (12):

wherein r is an integer of 0 to 5;

wherein in [NH—$(CH_2)_{s1}$] units, s1's each independently are an integer of 1 to 5; and t1 is an integer of 2 to 5.

10. The ternary polymer composite of claim 8, wherein the amine compound residue having a primary amine is —NH—$(CH_2)_2$—$NH_2$ or —NH—$(CH_2)_2$—NH—$(CH_2)_2$—$NH_2$.

11. The ternary polymer composite of claim 8, wherein the compound represented by formula (10) is at least one selected from compounds represented by formulae (Ia) to (Ig):

(Ia)

(Ib)

(Ic)

(Id)

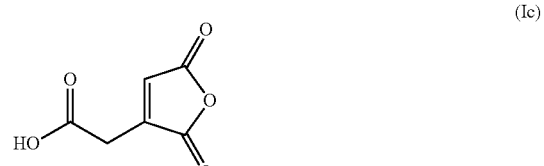

(Ie)

(If)

-continued

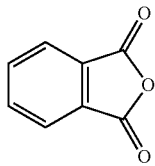
(Ig)

12. A pharmaceutical composition, comprising:
the polyion complex of claim 7; and
a pharmaceutically acceptable carrier.

13. A pharmaceutical composition, comprising:
the ternary polymer composite of claim 8; and
a pharmaceutically acceptable carrier.

14. The anionic polymer of claim 1, wherein the in vivo cleavable bond is a disulfide bond.

15. The anionic polymer of claim 1, wherein the in vivo cleavable bond is an acetal bond.

16. The anionic polymer of claim 1, wherein the in vivo cleavable bond is a hydrazone bond.

17. The anionic polymer of claim 4, wherein l is an integer of 80 to 220, and a sum of l and m is 2 to 18.

18. A polyion complex, comprising:
the anionic polymer of claim 1, and
polyethylene imine.

19. A polyion complex, comprising:
the anionic polymer of claim 1, and
poly-[2-{(2-aminoethyl)amino}-ethyl-aspartamide] (pAsp(DET)).

20. A polyion complex, comprising:
the anionic polymer of claim 1, and
a block co-polymer of polyethylene glycol and poly-[2-{(2-aminoethyl)amino}-ethyl-aspartamide] (PEG-pAsp(DET)).

* * * * *

SEQUENCE LISTING

```
<160> NUMBER OF SEQ ID NOS: 6

<210> SEQ ID NO 1
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide synthesized by Hokkaido System
      Science
<220> FEATURE:
<223> OTHER INFORMATION: Description of Combined DNA/RNA Molecule:
      Synthetic oligonucleotide synthesized by Hokkaido System Science
<220> FEATURE:
<221> NAME/KEY: modified_base
<222> LOCATION: (20)..(21)
<223> OTHER INFORMATION: dT

<400> SEQUENCE: 1
uucuccgaac gugucacgut t                                             21

<210> SEQ ID NO 2
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide synthesized by Hokkaido System
      Science
<220> FEATURE:
```

```
-continued

<223> OTHER INFORMATION: Description of Combined DNA/RNA Molecule:
      Synthetic oligonucleotide synthesized by Hokkaido System Science
<220> FEATURE:
<221> NAME/KEY: modified_base
<222> LOCATION: (20)..(21)
<223> OTHER INFORMATION: dT

<400> SEQUENCE: 2
acgugacacg uucggagaat t                                              21

<210> SEQ ID NO 3
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide synthesized by Hokkaido System
      Science
<220> FEATURE:
<223> OTHER INFORMATION: Description of Combined DNA/RNA Molecule:
      Synthetic oligonucleotide synthesized by Hokkaido System Science
<220> FEATURE:
<221> NAME/KEY: modified_base
<222> LOCATION: (20)..(21)
<223> OTHER INFORMATION: dT

<400> SEQUENCE: 3
cuuacgcuga guacuucgat t                                              21

<210> SEQ ID NO 4
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide synthesized by Hokkaido System
      Science
<220> FEATURE:
<223> OTHER INFORMATION: Description of Combined DNA/RNA Molecule:
      Synthetic oligonucleotide synthesized by Hokkaido System Science
<220> FEATURE:
<221> NAME/KEY: modified_base
<222> LOCATION: (20)..(21)
<223> OTHER INFORMATION: dT

<400> SEQUENCE: 4
ucgaaguacu cagcguaagt t                                              21

<210> SEQ ID NO 5
<211> LENGTH: 100
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Asp Asp Asp Asp Asp Asp Asp Asp Asp Asp Asp Asp Asp Asp Asp Asp
1               5                   10                  15

Asp Asp Asp Asp Asp Asp Asp Asp Asp Asp Asp Asp Asp Asp Asp Asp
            20                  25                  30

Asp Asp Asp Asp Asp Asp Asp Asp Asp Asp Asp Asp Asp Asp Asp Asp
        35                  40                  45

Asp Asp Asp Asp Asp Asp Asp Asp Asp Asp Asp Asp Asp Asp Asp Asp
    50                  55                  60

Asp Asp Asp Asp Asp Asp Asp Asp Asp Asp Asp Asp Asp Asp Asp Asp
65                  70                  75                  80
```

```
Asp Asp Asp Asp Asp Asp Asp Asp Asp Asp Asp Asp Asp Asp Asp
                85                  90                  95
Asp Asp Asp Asp
        100

<210> SEQ ID NO 6
<211> LENGTH: 200
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Asp Asp Asp Asp Asp Asp Asp Asp Asp Asp Asp Asp Asp Asp Asp Asp
1               5                   10                  15

Asp Asp Asp Asp Asp Asp Asp Asp Asp Asp Asp Asp Asp Asp Asp Asp
                20                  25                  30

Asp Asp Asp Asp Asp Asp Asp Asp Asp Asp Asp Asp Asp Asp Asp Asp
            35                  40                  45

Asp Asp Asp Asp Asp Asp Asp Asp Asp Asp Asp Asp Asp Asp Asp Asp
        50                  55                  60

Asp Asp Asp Asp Asp Asp Asp Asp Asp Asp Asp Asp Asp Asp Asp Asp
65                  70                  75                  80

Asp Asp Asp Asp Asp Asp Asp Asp Asp Asp Asp Asp Asp Asp Asp Asp
                85                  90                  95

Asp Asp Asp Asp Asp Asp Asp Asp Asp Asp Asp Asp Asp Asp Asp Asp
                100                 105                 110

Asp Asp Asp Asp Asp Asp Asp Asp Asp Asp Asp Asp Asp Asp Asp Asp
            115                 120                 125

Asp Asp Asp Asp Asp Asp Asp Asp Asp Asp Asp Asp Asp Asp Asp Asp
        130                 135                 140

Asp Asp Asp Asp Asp Asp Asp Asp Asp Asp Asp Asp Asp Asp Asp Asp
145                 150                 155                 160

Asp Asp Asp Asp Asp Asp Asp Asp Asp Asp Asp Asp Asp Asp Asp Asp
                165                 170                 175

Asp Asp Asp Asp Asp Asp Asp Asp Asp Asp Asp Asp Asp Asp Asp Asp
            180                 185                 190

Asp Asp Asp Asp Asp Asp Asp Asp
                195                 200
```